(12) United States Patent
Mirfakhraei et al.

(10) Patent No.: US 10,616,011 B1
(45) Date of Patent: Apr. 7, 2020

(54) DISTORTION CANCELLATION

(71) Applicant: Cisco Technology, Inc., San Jose, CA (US)

(72) Inventors: Khashayar Mirfakhraei, Los Altos, CA (US); Ardalan Alizadeh, San Jose, CA (US); Xu Zhang, Fremont, CA (US); Gautam D. Bhanage, Milpitas, CA (US); Daniel J. Lyons, Medina, OH (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/453,839

(22) Filed: Jun. 26, 2019

(51) Int. Cl.
| | |
|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |

(Continued)

(52) U.S. Cl.
CPC .... *H04L 25/0328* (2013.01); *H04L 25/03286* (2013.01); *H04L 25/03292* (2013.01); *H04L 2001/0096* (2013.01); *H04L 2025/0377* (2013.01); *H04L 2025/03464* (2013.01)

(58) Field of Classification Search
CPC .......... H04L 25/0328; H04L 25/03286; H04L 25/03292; H04L 2025/03464; H04L 2001/0096; H04L 2025/0377; H04L 1/0045; H04L 25/0204; H04L 25/03019; H04L 1/005; H04B 1/71072; H04B 7/0456; H04W 72/042

USPC ................. 375/346, 229, 230, 232
See application file for complete search history.

(56) References Cited

U.S. PATENT DOCUMENTS

| | | | |
|---|---|---|---|
| 8,144,807 B2 | 3/2012 | Mirfakhraei et al. | |
| 8,665,693 B1 * | 3/2014 | Cheng ..................... | H04L 1/005 370/204 |

(Continued)

OTHER PUBLICATIONS

Heino et al., Recent Advances in Antenna Design and Interference Cancellation Algorithms for In-Band Full Duplex Relays, IEEE Comm., vol. 53 No. 5 (May 2015) [Abstract Only].

(Continued)

*Primary Examiner* — Phuong Phu
(74) *Attorney, Agent, or Firm* — Patterson + Sheridan LLP

(57) ABSTRACT

The present disclosure provides for distortion cancelled by receiving a collided signal, the collided signal comprising a first signal carrying a first packet and a second signal carrying a second packet; amplifying and digitizing the collided signal into a first digital signal at a first gain and a second digital signal at a second gain that is greater than the first gain; determining a nonlinear interference component of the first packet on the second packet from the first digital signal; decoding the first packet from the first digital signal; re-encoding the first packet with a first estimated channel effect into an estimated signal; calculating a linear interference component of the first packet on the second packet from the estimated signal; removing the linear interference component and the nonlinear interference component from the second digital signal to produce a de-interfered signal; and decoding the second packet from the de-interfered signal.

20 Claims, 11 Drawing Sheets

(51) Int. Cl.
   *H04L 25/08*   (2006.01)
   *H04L 25/03*   (2006.01)

(56) References Cited

U.S. PATENT DOCUMENTS

| | | | |
|---|---|---|---|
| 9,467,986 B2 | 10/2016 | Lyons | |
| 9,521,018 B1* | 12/2016 | Bose | H04L 25/0204 |
| 9,866,416 B2 | 1/2018 | Lyons | |
| 2007/0195904 A1* | 8/2007 | Kemenczy | H04L 25/0328 |
| | | | 375/262 |
| 2009/0175327 A1* | 7/2009 | Chen | H04L 25/03019 |
| | | | 375/231 |
| 2011/0051865 A1* | 3/2011 | Mergen | H04B 1/71072 |
| | | | 375/347 |
| 2011/0299612 A1* | 12/2011 | Tan | H04L 1/0045 |
| | | | 375/260 |
| 2016/0182134 A1* | 6/2016 | Kol | H04B 7/0456 |
| | | | 370/329 |
| 2017/0303244 A1* | 10/2017 | Song | H04W 72/042 |

OTHER PUBLICATIONS

A. Balatsoukas-Stimming, Non-linear self-interference cancellation in full-duplex using Neural Networks, Telecommunication Circuits Lab., Fed. P.Tech. School of Lausanne, (Oct. 5, 2018).

D. Korpi, L. Anttila, & M. Valkama, Nonlinear self-interference cancellation in MIMO full-duplex transceivers under crosstalk, EURASIPJournal on Wireless Comm. and Netw., vol. 2017, No. 1, p. 24, Feb. 2017.

P. Patel & J. Holtzman, Analysis of a simple successive interference cancellation scheme in a DS/CDMA system, IEEE J. on Selected Areas in Communications, vol. 12, No. 5, pp. 796-807 (Jun. 1994) [Abstract Only].

* cited by examiner

DISTORTION CANCELLATION

TECHNICAL FIELD

Embodiments presented in this disclosure generally relate to wireless transmission receivers. More specifically, embodiments disclosed herein relate to wireless transmission receivers adapted to identify individual packets transmitted on a shared channel at a shared time that interfere with one another.

BACKGROUND

When multiple devices within communications range of one another wirelessly communicate, the signals may be separated in time and/or frequency to allow receiving devices to differentiate individual communications. For example, the available frequencies for communications between two devices may be divided into several channels so that the two devices may transmit data at the same time in different portions of the available frequency range, and the receiving devices can identify an individual communication by filtering out data carried in undesired frequencies of the range. In another example, two devices may communicate in a shared frequency range by specifying various times that are reserved for particular communications, so that a first communication is sent during a first time window (and not during a second time window), and a second communication is sent during a second time window (and not during the first time window), to that a receiving device can identify an individual communication based on an associated time window (also referred to as time multiplexing). However, even when the communications medium has been divided into channels or time divisions, two or more transmissions may collide and interfere with one another at a receiving device due to multi-pathing, carrier signal drift, clock drift, the devices moving within the environment, the addition of new devices to the environment, etc.

As used herein, a collided signal is an analog signal that includes two or more other component analog signals received from a corresponding number of signal sources. A signal collision between the two or more component analog signals (resulting in a collided signal at a receiving device) may occur in a Frequency Division Multiplexed (FDM) environment, a Time Division Multiplexed (TDM) environment, or a Frequency and Time Division Multiplexed (FTDM) environment, when the component analog signals share at least a portion of the same frequency range for at least a portion of the same time window. As opposed to signals that merely interfere with one another, each of the component analog signals that collide to form the collided signal carry a corresponding digital packet of data that is of interest to the receiving device. Stated differently, the collided signal includes two or more packets that the receiving device is expecting to receive, but did not expect to receive in the same time or frequency division. Accordingly, the receiving device attempts to extract all of the packets from the collided signal.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

Description of Example Embodiments

Overview

Figure 1:
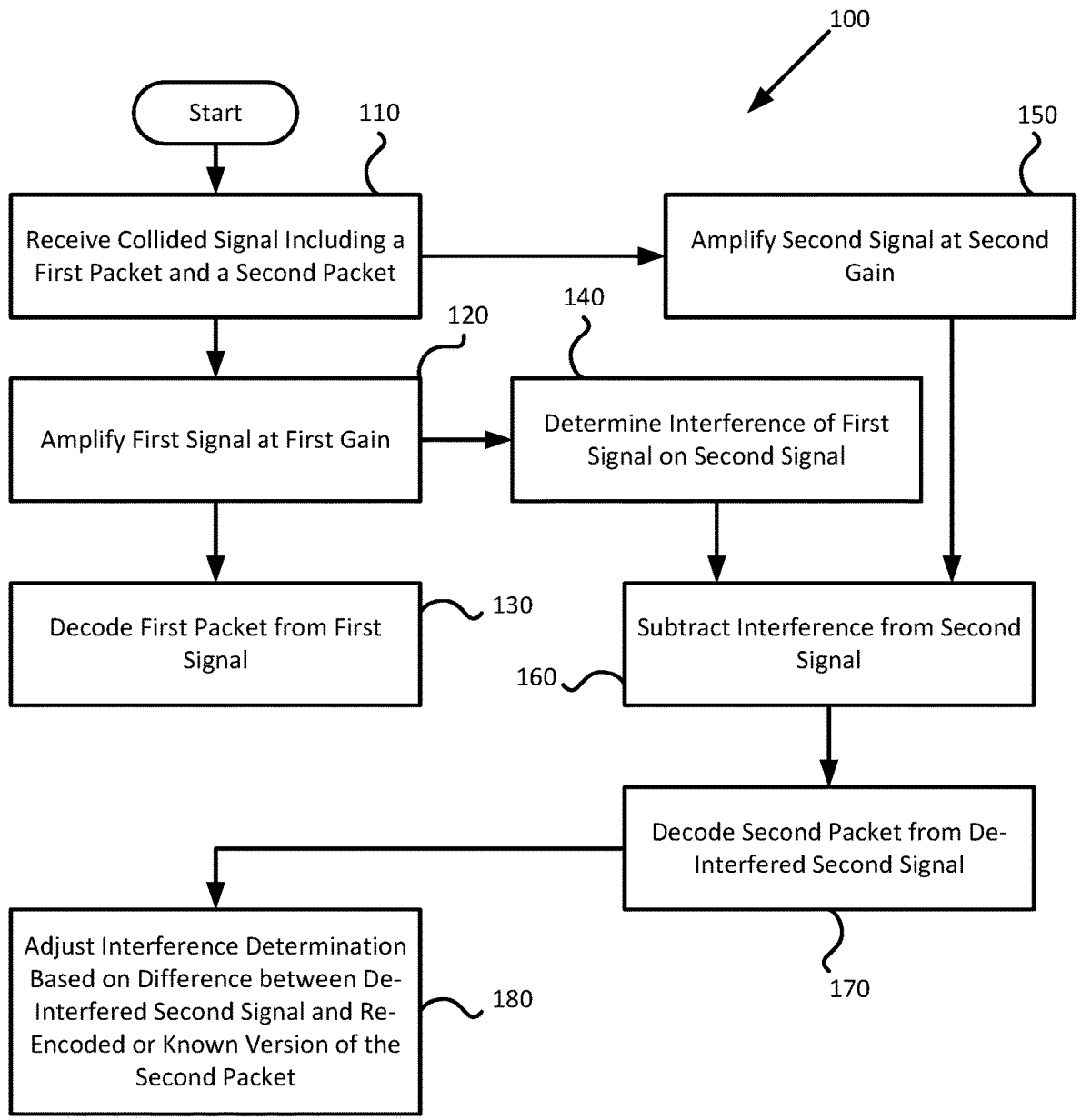
FIG. 1 is a flowchart of a method for decoding a first packet and a second packet from a collided signal, according to aspects of the present disclosure.

One embodiment presented in this disclosure provides for a system for distortion cancellation, the system including: a first receiver pathway, configured to digitize and amplify a first collided signal including a first signal carrying a first packet collided with a second signal carrying a second packet at a first gain to produce a first digital signal; a second receiver pathway, configured to digitize and amplify a second collided signal including the first signal collided with the second signal at a second gain, greater than the first gain, to produce a second digital signal; a nonlinear estimator, configured to determine a nonlinear interference component of the first packet on the second packet from the first digital signal; a first receiver, configured to decode the first packet from the first digital signal; a re-encoder, configured to re-encode the first packet with an estimated first channel effect to produce an estimated signal; a linear estimator, configured to determine a linear interference component of the first packet on the second packet from the estimated signal; a subtractor, configured to remove the linear interference component and the nonlinear interference component from the second digital signal to produce a de-interfered signal; and a second receiver, configured to decode the second packet from the de-interfered signal.

One embodiment presented in this disclosure provides for a method for distortion cancellation, the method including: receiving a collided signal, the collided signal comprising a first signal carrying a first packet and a second signal carrying a second packet; amplifying and digitizing the collided signal into a first digital signal at a first gain and a second digital signal at a second gain that is greater than the first gain; determining a nonlinear interference component of the first packet on the second packet from the first digital signal; decoding the first packet from the first digital signal; re-encoding the first packet with a first estimated channel effect into an estimated signal; calculating a linear interference component of the first packet on the second packet from the estimated signal; removing the linear interference component and the nonlinear interference component from the second digital signal to produce a de-interfered signal; and decoding the second packet from the de-interfered signal.

One embodiment presented in this disclosure provides for a computer readable storage device including instructions that when executed by a processor perform an operation for distortion cancellation, the operation including: receiving a collided signal, the collided signal comprising a first signal carrying a first packet and a second signal carrying a second packet; amplifying and digitizing the collided signal into a first digital signal at a first gain and a second digital signal at a second gain that is greater than the first gain; determining a nonlinear interference component of the first packet on the second packet from the first digital signal; decoding the first packet from the first digital signal; re-encoding the first packet with a first estimated channel effect into an estimated signal; calculating a linear interference component of the first packet on the second packet from the estimated signal; removing the linear interference component and the nonlinear interference component from the second digital signal to produce a de-interfered signal; and decoding the second packet from the de-interfered signal.

Example Embodiments

A receiving device, to extract the individual packets included in a collided signal, may perform various analyses to determine the interfering effect of a first packet on a second packet in the collided signal and the interfering effect of the second packet on the first packet. The receiving device may then remove the interfering effects of the first and second packets from the collided signal to produce a de-interfered versions of the collided signal from which the first and second packets can be decoded.

However, in dynamic gain receivers, which adjust the amplification of received signals to the operational range of an associated Analog to Digital Converter (ADC), when the amplitudes of the component signals of the collided signal differ, the receiver may apply a dynamic gain appropriate for a first component signal and inappropriate for a second component signal to the collided signal, which may result in lower fidelity extraction and decoding of the first and second packets than if the component signals were received individually. For example, if the dynamic gain is set to a high value for a first component signal, and a higher-powered second component signal collides with the first component signal, the receiver may over-amplify the collided signal, which results in nonlinear distortions and increased harmonics when interpreting the second component signal.

The present disclosure employs path diversity (spatial or Radio Frequency in various embodiments) with multiple different gain levels to extract the individual packets from the collided signal. One signal path is set with an aggressive (i.e., high) gain and another signal path is set with a conservative (i.e., low) gain based on the characteristics (e.g., amplitude range) of the received signals. The packet with the greater power is extracted from the conservatively set signal path, and is used to determine the linear and nonlinear interference effects of the first packet on the second packet in the collided signal. These effects are then removed from the aggressively set signal path, and the packet with the lower power is extracted from the resulting output. To improve the accuracy at which the receiving device determines the linear and nonlinear components of the interference of the first packet on the second packet, a nonlinear estimator and linear estimator may be trained either online or offline using various machine learning techniques.

Turning now to FIG. 1, a method 100 for decoding a first packet and a second packet with greater fidelity from a collided signal is provided. At block 110, the de-collider receives a collided signal that includes a first packet and a second packet. The de-collider decodes the first packet and the second packet from the collided signal on separate signal pathways. In some embodiments, the de-collider receives the collided signal via a single antenna and splits the collided signal onto a first signal pathway (from which the first packet is decoded) and a second signal pathway (from which the second packet is decoded). In other embodiments, the de-collider receives the collided signal via two antennas as a first collided signal that is carried on a first signal pathway from which the first packet is decoded and as a second collided signal that is carried on a second signal pathway from which the second packet is decoded.

At block 120, the de-collider applies a first gain (G1) to a first signal carried on the first signal pathway. An amplifier dynamically matches the amplitude of the first signal to the operational range of an ADC on the first signal pathway by applying a first Radio Frequency gain (G1-RF). The ADC in turn applies an amplification of a first baseband gain (G1-BB) to the amplified first signal when digitizing the first signal. The total gain of the first signal pathway may be expressed as the gain of the amplifier multiplied by the gain of the ADC (i.e., G1=G1-RF*G1-BB). In some embodiments, the first gain (G1) is set as a predefined fraction of a second gain (G2) applied on a second signal pathway (per block 150). In other embodiments, the first gain is set based on the amplitude of the first component signal of the collided signal, which may be the earliest-received component signal or the component signal with the greatest amplitude at the time of reception.

At block 130, the de-collider decodes the first packet from the digitized first signal. In some embodiments, the first packet is output for use by various applications and components downstream from the de-collider.

At block 140, the de-collider determines the interference of the first packet on the second packet in the collided signal. In digital/digital embodiments of the de-collider, the linear and nonlinear interference components are determined as digital effects of the first packet on the second packet in the collided signal. In digital/analog embodiments of the de-collider, the linear and nonlinear interference components are determined as digital effects of the first packet on the second packet in the collided signal, and the linear interference components are re-synthesized from digital components to analog components.

At block 150, the de-collider applies a second gain (G2) to a second signal carried on the second signal pathway. In some embodiments, the second amplifier sets the total second gain to be greater than the total first gain. In some embodiments, the second amplifier sets at least one of the second RF gain and the second baseband gain to be greater than the total first gain. Block 150 is performed in parallel with blocks 120-140, and may be performed before or in parallel with block 160 in various embodiments.

At block 160, de-collider subtracts the linear interference component and the nonlinear interference component (determined per block 140) of the first packet from the second signal.

In digital/digital embodiments of the de-collider, the de-collider performs block 150 before proceeding to block 160. In a digital/digital embodiment of the de-collider, the amplifier dynamically matches the amplitude of the second signal to the operational range of an ADC on the second signal pathway by applying a second Radio Frequency gain (G2-RF). The ADC in turn applies an amplification of a second baseband gain (G2-BB) to the amplified second signal when digitizing the second signal. The total gain of the second signal pathway may be expressed as the gain of the amplifier multiplied by the gain of the ADC (i.e., G2=G2-RF*G2-BB), and the second gain is greater than the first gain (i.e., G2>G1). In various embodiments, de-collider sets the gains G1 and G2 relative to one another (e.g., G2=x*G1). The de-collider then subtracts the linear interference component and the nonlinear interference component of the first packet from the amplified and digitized second signal to produce a de-interfered second signal.

In digital/analog embodiments of the de-collider, the de-collider performs block 150 in parallel with block 160. In a digital/analog embodiment of the de-collider, the amplifier on the second signal pathway applies a gain (G2-RF) to the second signal, and the de-collider subtracts an analog linear interference component from the amplified analog second signal. After removing the linear interference component, the de-collider digitizes the amplified analog second signal via an ADC, which applies an amplification of a second baseband gain (G2-BB) to the digitized second signal, and subtracts the digital nonlinear interference component (determined per block 140) from the digitized second signal to produce a de-interfered second signal. The total gain of the second signal pathway may be expressed as the gain of the amplifier multiplied by the gain of the ADC (i.e., G2=G2-RF*G2-BB), and the second gain is greater than the first gain (i.e., G2>G1). In some embodiment, the gain G2-RF may be set so that the amplitude of the partially de-interfered analog second signal (having the linear interference component removed therefrom) matches the operational range of the ADC on the second signal pathway.

At block 170, the de-collider decodes the second packet from the de-interfered second signal. In various embodiments, the de-collider uses the same receiver to de-code the second packet as to decode the second packet, while in other embodiments, the de-collider uses two different receivers to decode the respective packets (per block 130 and block 170). In some embodiments, the receiver is an EVERSCALE™ receiver (available from Cisco Systems, Inc. of San Jose, Calif.), although other de-coding receivers may be used in other embodiments.

At block 180, the de-collider adjusts how the interference determination (per block 140) is made based on a difference between the de-interfered second signal (produced per block 160) and a re-encoded or known version of the second packet. Method 100 may then conclude or repeat from block 110.

Figure 2A:
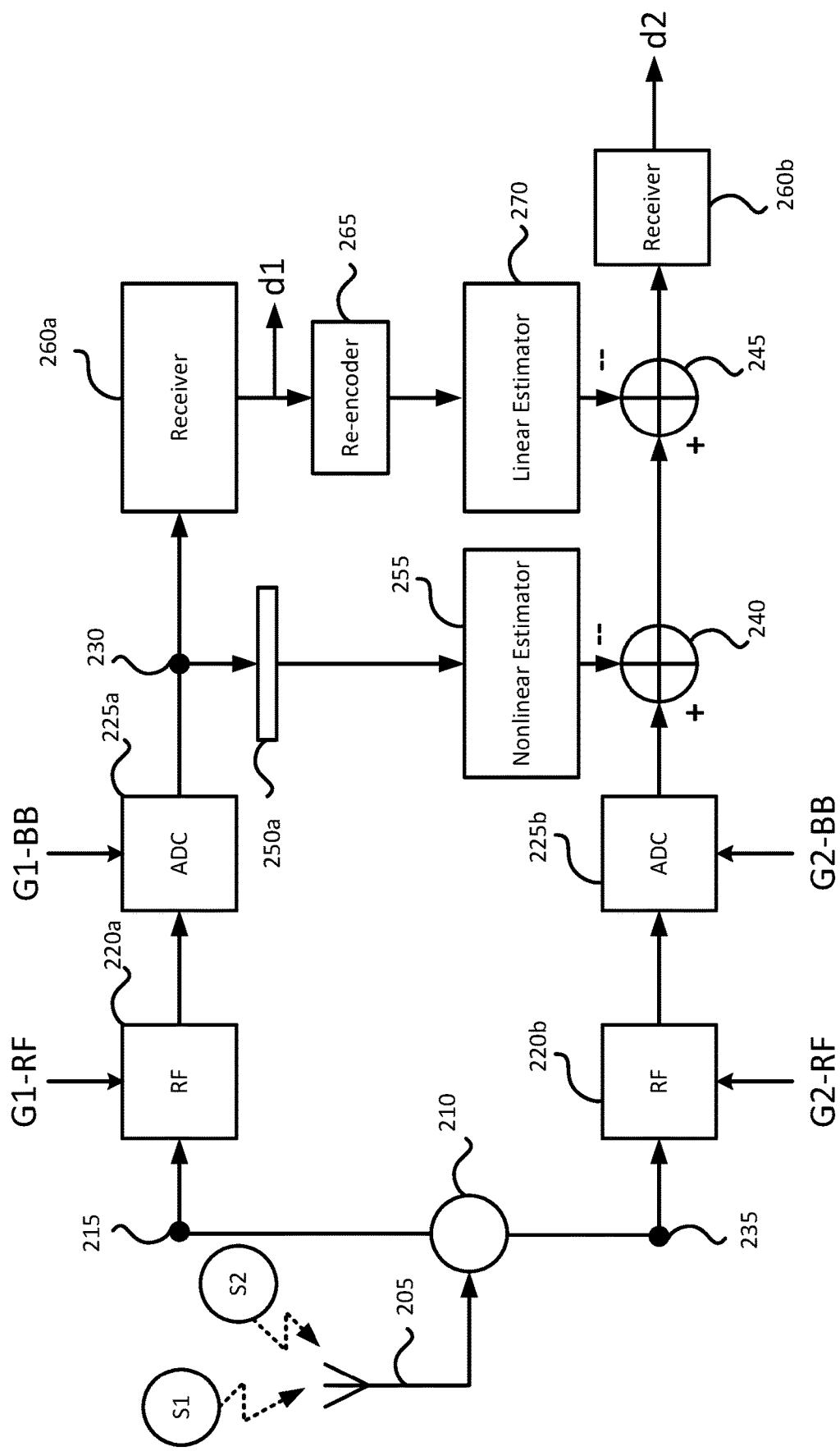
FIGS. 2A and 2B illustrate embodiments of a digital/digital de-collider, according to aspects of the present disclosure.
Figure 2B:
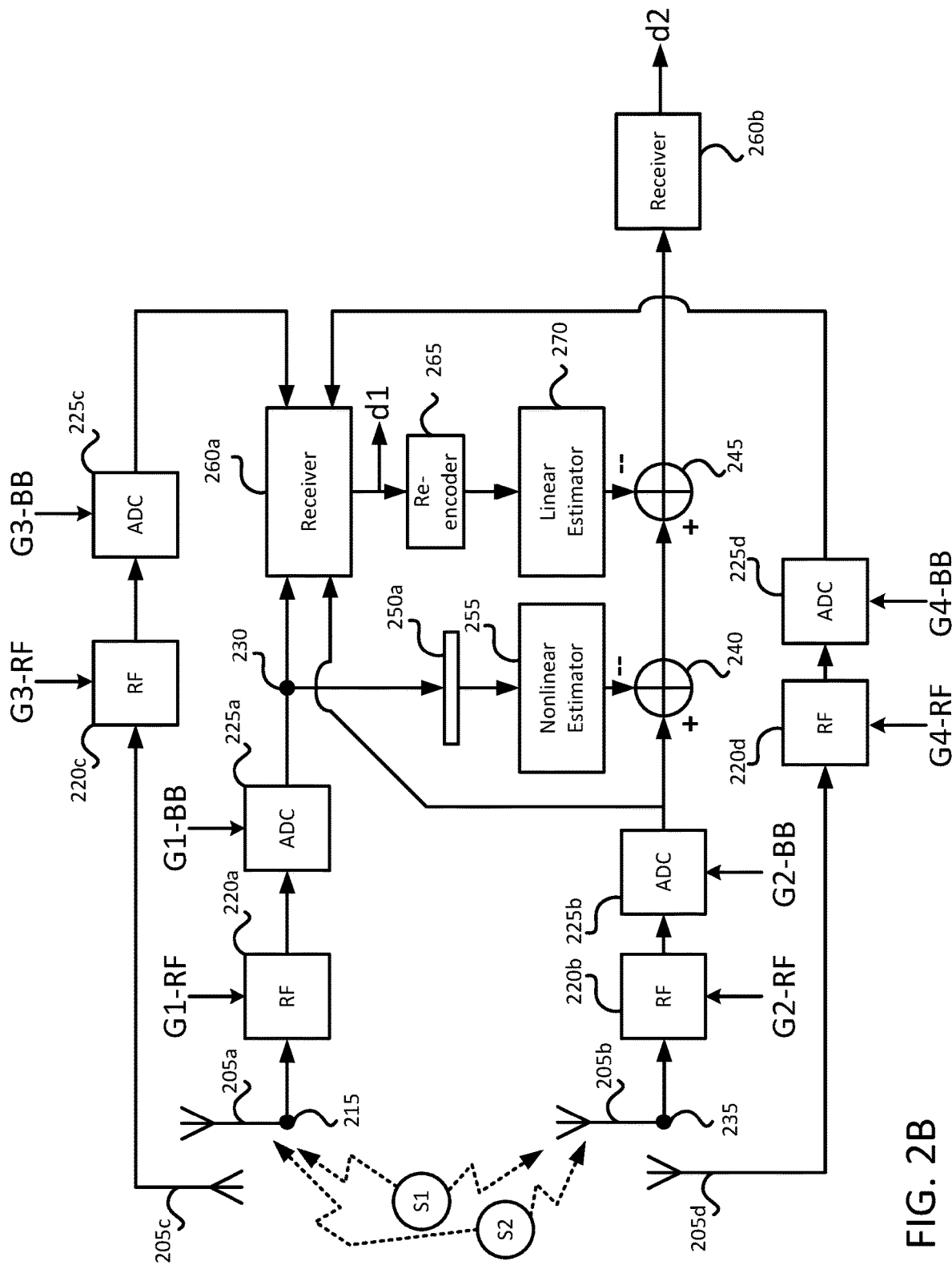

FIGS. 2A and 2B illustrate embodiments of a digital/digital de-collider 200. FIG. 2A illustrates a de-collider 200 using a single, shared antenna 205, and FIG. 2B illustrates a de-collider 200 using a first antenna 205a and a second antenna 210b (generally, antennas 205). The antennas 205 are illustrated as receiving the component signals from a first signal source S1 and a second signal source S2. Several elements of the digital/digital de-collider 200 are implemented as hardware components (e.g., antennas 205, splitter 210), while others may be implemented as hardware or as specialized computing components running software/firmware to perform the recited functionalities described herein (e.g., receiver 260, re-encoder 265, linear estimator 270).

In FIG. 2A, the first component signal $s_1(t)$, from the first signal source S1, is subject to first channel conditions $h_1(t)$ (e.g., interference, noise, path losses) and the second component signal $s_2(t)$ from the second signal source S2 is subject to second channel conditions $h_2(t)$, such that the collided signal $s_{collided}(t)$ received by the antenna 205 may be represented according to Formula 1.

$$s_{collided}(t)=h_1(t)*s_1(t)+h_2(t)*s_2(t) \quad (1)$$

A splitter 210 in communication with the antenna 205 in FIG. 2A splits the collided signal $s_{collided}(t)$ onto a first signal pathway and onto a second signal pathway. In various embodiments, the splitter 210 is a Y-splitter that splits the collided signal $s_{collided}(t)$ into two substantially equal (±10%) amplitude signals, although in other embodiments, the amplitudes of the first and second signals may be unevenly split by the splitter 210. The first collided signal $s_{1c}(t)$ and the second collided signal $s_{2c}(t)$ carried on the respective first and second signal pathways may thus be represented according to Formula 2a and optionally according to Formula 3a in the embodiment illustrated in FIG. 2A.

$$s_{collided}(t)=s_{1c}(t)+s_{2c}(t) \quad (2a)$$

$$s_{1c}(t) \approx s_{2c}(t) \approx (h_1(t)*s_1(t)+h_2(t)*s_2(t))/2 \quad (3a)$$

In FIG. 2B, the first component signal $s_1(t)$, from the first signal source S1, is subject to first channel conditions $h_1(t)$ (e.g., interference, noise, path losses) and the second component signal $s_2(t)$ from the second signal source S2 is subject to second channel conditions $h_2(t)$, such that the first collided signal $s_{1c}(t)$ received by the first antenna 205a and the first signal pathway may be represented according to Formula 2b. The second antenna 205b, however, is spatially distinct from the first antenna 205a, and the first component signal $s_1(t)$ may be subject to third channel conditions $h_3(t)$ different from the first channel conditions $h_1(t)$, and the second component signal $s_2(t)$ may be subject to fourth channel conditions $h_4(t)$ different from the second channel conditions $h_2(t)$ such that the second collided signal $s_{2c}(t)$ received by the second antenna 205b and the second signal pathway may be represented according to Formula 3b.

$$s_{1c}(t)=h_1(t)*s_1(t)+h_2(t)*s_2(t) \quad (2b)$$

$$s_{2c}(t)=h_3(t)*s_1(t)+N(t)*s_2(t) \quad (3b)$$

In FIGS. 2A and 2B, the first signal pathway includes a first node 215 and a second node 230, between which a first amplifier 220a (generally, amplifier 220) and a first ADC 225a (generally, ADC 225) are connected. The first amplifier 220a applies a gain of G1-RF to the first collided signal $s_{1c}(t)$, and the first ADC 225a digitizes the first collided signal $s_{1c}(t)$ and applies a baseband gain of G1-BB to the collided signal $s_{1c}(t)$ to produce a first digitized signal $s_{1d}[n]$. Similarly, the second signal pathway includes a third node 235 and a fourth node, between which a second amplifier 220b and a second ADC 225b are connected. The second amplifier 220b applies a gain of G2-RF to the second collided signal $s_{2c}(t)$, and the second ADC 225b digitizes the second collided signal $s_{2c}(t)$ and applies a baseband gain of G2-BB to the second collided signal $s_{2c}(t)$ to produce a second digitized signal $s_{2d}[n]$. The overall gain G1 on the first signal pathway may be represented according to Formula 4, and the overall again G2 on the second signal pathway may be represented according to Formula 5. The relationship between the first gain G1 and the second gain G2 may be represented according to Formula 6.

$$G1=G1\text{-}RF*G1\text{-}BB \quad (4)$$

$$G2=G2\text{-}RF*G2\text{-}BB \quad (5)$$

$$G1<G2 \quad (6)$$

A de-collider 200 using multiple antennas 205 may optionally include a number of supplemental antennas 205 (which correspond to an equal number of supplemental signal pathways that feed into the first receiver 260a and include an amplifier 220 and an ADC 225), depending on the number of spatially multiplexed packets expected to be received on the main antennas (e.g., first antenna 205a and second antenna 205b). In embodiments that include supplemental antennas 205, the total quantity of antennas 205 employed $Q_{Antennas}$, should be at least equal to (but may be greater than) $1.5*(m_1+m_2)+1$, where $m_1$ is the number of spatially multiplexed signals in a first packet, and $m_2$ is the number of spatially multiplexed signals in a second packet. As illustrated in FIG. 2B, $Q_{Antennas}$ is set to four, as one packet is received at the first antenna 205a (i.e., $m_1=1$) and one packet is received at the second antenna ($m_2=1$), but more than four antennas 205 may be employed in other embodiments. Accordingly, as illustrated in FIG. 2B, a third signal pathway is associated with a third antenna 205c, a third amplifier 220c, and a third ADC 225c that provide a third digitized signal $s_{3d}[n]$ to the first receiver 260a, and a fourth signal pathway is associated with a fourth antenna 205d, a fourth amplifier 220d, and a fourth ADC 225d that provide a fourth digitized signal $s_{4d}[n]$ to the first receiver 260a. In embodiments where more packets are collided, more supplemental antennas 205 and corresponding supplemental signal pathways (not illustrated) may be employed. As will be appreciated, each of the signals received by and processed on the supplemental signal pathways are affected by different channel effects, $h_x(t)$, and accordingly each supplemental signal pathway may apply a different gain Gx (i.e., Gx-RF*Gx-BB) based on the operational range of the associated ADC 225 and the received signal strength, which may be set independently of G1 or G2.

Because the ADCs 225 may introduce non-linearities into the digitized signals when digitizing the respective collided signals, particularly when the gain of the respective amplifier 220 amplifies the collided signal beyond the operating range of the ADC 225, the de-collider 200 may set the second gain G2-RF based on the operating range of the second ADC 225b, and the first gain G1-RF as a predetermined lower value based on G2-RF or based on the operating range of the first ADC 225a. The non-linearities of the respective signal paths may be included in the respective digitized signal as a respective nonlinear interference component $f_{1NL}$ or $f_{2NL}$. Any noise in the respective signal paths, amplifiers 220, and ADCs 225 for a particular pathway may be included in the respective digitized signal as component $v_1$ or $v_2$. Accordingly, a first digitized signal $s_{1d}[n]$ may be represented according to Formula 7 in FIGS. 2A and 2B, and a second digitized signal $s_{2d}[n]$ may be represented according to Formula 8a or 8b in FIGS. 2A and 2B respectively.

$$s_{1d}[n]=G_1*(h_1[n]*s_1[n]+h_2[n]*s_2[n])+f_{1NL}(h_1[n]*s_1[n],h_2[n]*s_2[n])+v_1 \quad (7)$$

$$s_{2d}[n]=G_2*(h_1[n]*s_1[n]+h_2[n]*s_2[n])+f_{2NL}(h_1[n]*s_1[n],h_2[n]*s_2[n])+v_2 \quad (8a)$$

$$s_{2d}[n]=G2*(h_3[n]*s_1[n]+h_4[n]*s_2[n])+f_{2NL}(h_3[n]*s_1[n],h_4[n]*s_2[n])+v_2 \quad (8b)$$

The analog signals (and formulas based on analog signals) are indicated herein as function of time (indicated as x(t)), whereas the digital signals (and formulas based on digital signals) are indicated herein as functions of time windows or steps (indicated as x[n]).

An interference determination pathway connects the first signal pathway at the second node 230 with the second signal pathway at the fourth node. The fourth node of the de-collider 200 includes a first subtractor 240 and a second subtractor 245. A first digital delay 250a (generally, delay 250) and a nonlinear estimator 255 are connected between the second node 230 and the first subtractor 240. A first receiver 260a, a first re-encoder 265a, and a linear estimator 270 are connected between the second node 230 and the second subtractor. In other embodiments, the order of the first subtractor 240 and the second subtractor 245 in the fourth node may be reversed from what is shown in FIGS. 2A and 2B. In some embodiments, the first subtractor 240 and the second subtractor 245 are combined into a single component, while in other embodiments, the first subtractor and the second subtractor 245 are separate and distinct components from one another.

The interference determination pathway includes two parallel tracks: one track for determining the linear interference component of the first packet on the second packet and one track for determining the nonlinear interference component of the first packet on the second packet.

To estimate the linear interference component, the de-collider 200 includes a first receiver 260a (generally, receiver 260), a re-encoder 265, and a linear estimator 270 between the second node 230 and the second signal pathway. When using a single shared antenna 205, as in FIG. 2A, the first receiver 260a accepts the first digitized signal $s_{1d}[n]$ and decodes the first packet onto a first output as a decoded first packet d1. When using multiple antennas 205, as in FIG. 2B, the first receiver 260a accepts the first digitized signal $s_{1d}[n]$ and the second digitized signal $s_{2d}[n]$ and any supplemental digitized signals to decode the first packet as a decoded first packet d1. As illustrated in FIG. 2B, the first receiver 260a receives a third digitized signal $s_{3d}[n]$ and a fourth digitized signal $s_{4d}[n]$ as supplemental digitized signals, but other embodiments may receive more supplemental digitized signals. The re-encoder 265 re-encodes the decoded first packet d1 into a first estimated digital signal $s_{1e}[n]$ that estimates or approximates the first channel effect $h_1[n]$ (as $\hat{h}_1[n]$) and the first component signal $s_1[n]$ (as $\hat{s}_1[n]$) that produced the decoded first packet d1, which may be represented according to Formula 9.

$$s_{1e}[n]=\hat{h}_1[n]*\hat{s}_1[n] \quad (9)$$

As will be appreciated, the first channel effect and the associated estimated first channel effect ($h_1[n]$ and $\hat{h}_1[n]$) may be different from one another. Similarly, the first component signal and the associated estimated first component signal ($s_1[n]$ and $\hat{s}_1[n]$) may be different from one another. The differences in the estimated and actual values for the first channel effect and first component signal may be the result of noise in the first signal pathway (e.g., $v_1$ or $h_2[n]*s_2[n]$) or non-linearities introduced by the first ADC 225a (e.g., $f_{1NL}[n]$), and the re-encoder 265 may be more accurate when the Signal to Noise Ratio (SNR) on the first signal pathway is lower and the receiver 260 can more accurately decode the first packet.

The linear estimator 270 receives the first estimated digital signal $s_{1e}[n]$ and applies the gain G2 to the first estimated signal $s_{1e}[n]$ so that the de-collider 200 may remove the (estimated) effects of the first component signal $s_1(t)$ from the second signal pathway. The linear estimator 270 may be trained offline (i.e., using known input signals as per method 500 discussed in relation to FIG. 5) or online (i.e., using "live" or unknown input signals as per method 700 in relation to FIG. 7).

To estimate the nonlinear interference component, the de-collider 200 includes a first digital delay 250a and a nonlinear estimator 255 connected between the second node 230 and the second signal pathway. The first digital delay 250a may be located before or after the nonlinear estimator 255 in various embodiments, and synchronizes the output of the determination of the nonlinear interference component with the determination of the linear interference component so that the second signal pathway removes the nonlinear and linear interference components of the same time window from the second digitized signal $s_{2d}[n]$. For example, if the nonlinear estimator 255 determines the nonlinear interference component of the first digitized signal $s_{1d}[n]$ at time $t_0$ and the first receiver 260, re-encoder 265, and linear estimator 270 can process the first digitized signal $s_{1d}[n]$ to produce the linear interference component at time $t_1$, the first digital delay 250a delays the output of the nonlinear interference component by $(t_1-t_0)$. In various embodiments, the first digital delay 250a may be a discrete or an integrated component (e.g., a first-in-first-out register).

In various embodiments, the nonlinear estimator 255 is a Feed-Forward Artificial Neural Network (FFANN). The nonlinear estimator 255 receives inputs of the first digitized signal $s_{1d}[n]$ over m time periods n, and uses the current and historic values for $s_{1d}[n]$ to $s_{1d}[n-m]$ on the first signal pathway to estimate the nonlinear interference component of the first component signal $s_1[n]$ and the second component signal $s_2[n]$ on the second signal pathway. As new values for $s_{1d}[n]$ are received, the older values are cycled out (e.g., $s_{1d}[n]$ at time $t_0$ becomes $s_{1d}[n-1]$ at time $t_1$, which become $s_{1d}[n-2]$ at time $t_2$, etc.). The nonlinear estimator 255 weights the various input values, and the values of various hidden nodes that associate the various inputs together before producing the estimated nonlinear interference component for the second line $\hat{f}_{2NL}[n]$. In the de-collider 200 of FIG. 2A, $\hat{f}_{2NL}[n]$ may represent $\hat{f}_{2NL}(h_1[n]*s_1[n], h_2[n]*s_2[n])$, whereas in the de-collider of FIG. 2B, $\hat{f}_{2NL}[n]$ may represent $\hat{f}_{2NL}(h_3[n]*s_1[n], h_4[n]*s_2[n])$. The de-collider 200 may train the weights used by the nonlinear estimator 255 offline (i.e., using known input signals as per method 500 discussed in relation to FIG. 5) or online (i.e., using "live" or unknown input signals as per method 700 in relation to FIG. 7).

The first subtractor 240 includes a first minuend input, that accepts the second digitized signal $s_{2d}[n]$ from the second ADC 225b, and a first subtrahend input that accepts the estimated nonlinear interference component $\hat{f}_{2NL}[n]$ from the nonlinear estimator 255 to remove the nonlinear interference component $\hat{f}_{2NL}[n]$ from the second digitized signal $s_{2d}[n]$. The second subtractor 245 includes a second minuend input, that accepts the second digitized signal $s_{2d}[n]$, less the nonlinear interference component $\hat{f}_{2NL}[n]$, from the first difference output of the first subtractor 240, and a second subtrahend input that accepts the estimated linear interference component $G_2*s_{1e}[n]$ from the linear estimator 270 to remove the nonlinear interference component from the second digitized signal $s_{2d}[n]$. Each of the subtractors may be multiplexers that provide signals at the subtrahend inputs to negatively interfere with (e.g., cancel out a portion of) the signal input at the minuend inputs. The second difference output of the second subtractor 245 produces a de-interfered second signal $s_z[n]$, which may be represented according to Formula 10a or Formula 10b according to FIG. 2A or 2B respectively, where R represents a residual interference of the $f_{2NL}[n]$ on the second signal pathway (i.e., $f_{2NL}[n]-\hat{f}_{2NL}[n]$).

$$s_{2i}[n]=G_2*h_2[n]*s_2[n]+v_2+R \tag{10a}$$

$$s_{2i}[n]=G_2*h_4[n]*s_2[n]+v_2+R \tag{10b}$$

The second receiver 260b receives the de-interfered second signal $s_{2i}[n]$ and decodes the second packet from the de-interfered second signal $s_{2i}[n]$ onto a second output as decoded first packet d2. In various embodiments, the first receiver 260a and the second receiver 260b are separate input channels of a single receiver 260, while in other embodiments, the first receiver 260a and the second receiver 260b are discrete receivers 260.

Figure 3:
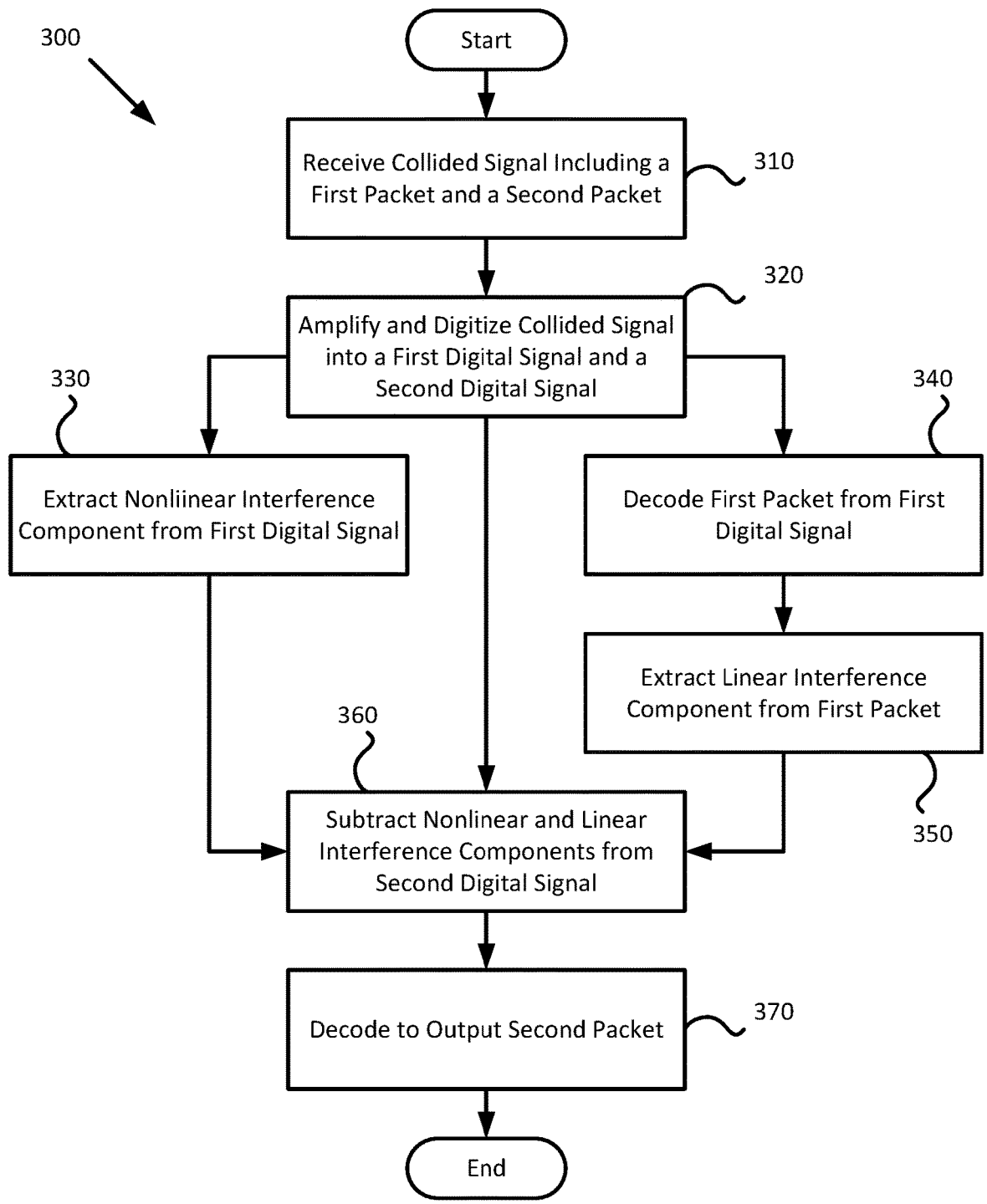
FIG. 3 is a flowchart of a method for de-colliding signals, as may be practiced with a digital/digital de-collider, according to aspects of the present disclosure.

FIG. 3 is a flowchart of a method 300 for de-colliding signals, as may be practiced with a de-collider 200 as described in relation to FIGS. 2A and 2B. Method 300 begins with block 310, where the de-collider 200 receives a collided signal (e.g., $s_{collided}(t)$) that includes a first component signal (e.g., $s_1(t)$) carrying a first packet and a second component signal (e.g., $s_2(t)$) carrying a second packet. In some embodiments, the collided signal is received at a shared antenna 205 and is split into a first collided signal (e.g., $s_{1c}(t)$) on a first signal pathway and a second collided signal (e.g., $s_{2c}(t)$) on a second signal pathway. In other embodiments, the collided signal is received independently on each signal pathway by distinct antennas 205. For example, the collided signal is received at a first antenna 205a with a first channel effect (e.g., $h_1(t)$) from a first source (e.g., S1) affecting the first packet and a second channel effect (e.g., $h_2(t)$) from a second source (S2) affecting the second packet as a first collided signal on the first signal pathway while the collided signal is received at a second antenna 205b with a third channel effect (e.g., $h_3(t)$) from the first source affecting the first packet and a fourth channel effect (e.g., $h_4(t)$) from the second source affecting the second packet as a second collided signal on the second signal pathway.

At block 320, the de-collider 200, on a first signal pathway that includes a first amplifier 220a and a first ADC 225a, amplifies and digitizes the collided signal according to a first gain (e.g., G1) to produce a first digital signal (e.g., $s_{1d}[n]$). The de-collider 200, on a second signal pathway that includes a second amplifier 220b and a second ADC 225b, amplifies and digitizes the collided signal according to a second gain (e.g., G2) that is greater than the first gain to produce a second digital signal (e.g., $s_{2d}[n]$).

At block 330, the de-collider 200 extracts a nonlinear component of interference of the first packet on the second packet in the collided signal (e.g., $\hat{f}_{2NL}(h_1[n]*s_1[n], h_2[n]*s_2[n])$ or $\hat{f}_{2NL}(h_3[n]*s_1[n], h_4[n]*s_2[n])$) from the first digital signal. In various embodiments, the de-collider 200 uses a FFANN as a nonlinear estimator 255 to estimate the real and imaginary components of a given time or time window for the nonlinear interference component of the encoded first packet on the encoded second packet. In various embodiments, the output of the nonlinear interference component estimated according to block 330 is temporally delayed based on the processing time to extract the estimated linear interference component (according to block 340 and block 360 in method 300) so that the linear and nonlinear interference components are removed for the same time period from the second collided signal (according to block 360 in method 300).

At block 340, the de-collider 200 decodes the first packet from the first digital signal to produce a decoded first packet (e.g., d1). In various embodiments, the decoded first packet is provided as a first output of the de-collider 200. For example, a receiver 260 (e.g., an EVERSCALE™ receiver) may attempt to decode both the first signal and the second signal from the collided signal.

At block 350, the de-collider 200 extracts the linear interference component of the first packet on the second packet in the collided signal (e.g., $G_2 * s_{1e}[n]$). To estimate the linear interference component, the de-collider 200 re-encodes the decoded first packet into a first estimated digital signal (e.g., $s_{1e}[n]$) that approximates both the first channel effect (e.g., $\hat{h}_1(t)$) and the first component signal (e.g., $\hat{s}_1(t)$) as received in the collided signal, and feeds the estimated digital signal to a linear estimator 270. The linear estimator 270 extracts the linear component of interference of the first packet on the second packet in the collided signal from the estimated digital signal.

At block 360, the de-collider 200 removes the nonlinear component of interference and the linear component interference from the second digital signal to produce a de-interfered signal (e.g., $s_{1i}[n]$). In various embodiments, a first subtractor 240 removes the nonlinear inference component, and a second subtractor 245 removes the linear interference component. In other embodiments, a first subtractor 240 removes the linear inference component, and a second subtractor 245 removes the nonlinear interference component. In further embodiments, a single subtractor 240 removes the linear and nonlinear interference components.

At block 370, the de-collider 200 decodes the second packet from the de-interfered signal as a second decoded packet (e.g., d2). In various embodiments, the second decoded packet is provided as a second output of the de-collider 200. For example, a receiver 260 (e.g., an EVERSCALE™ receiver) may attempt to decode both the first signal and the second signal from the collided signal. Method 300 may then conclude.

Figure 4:
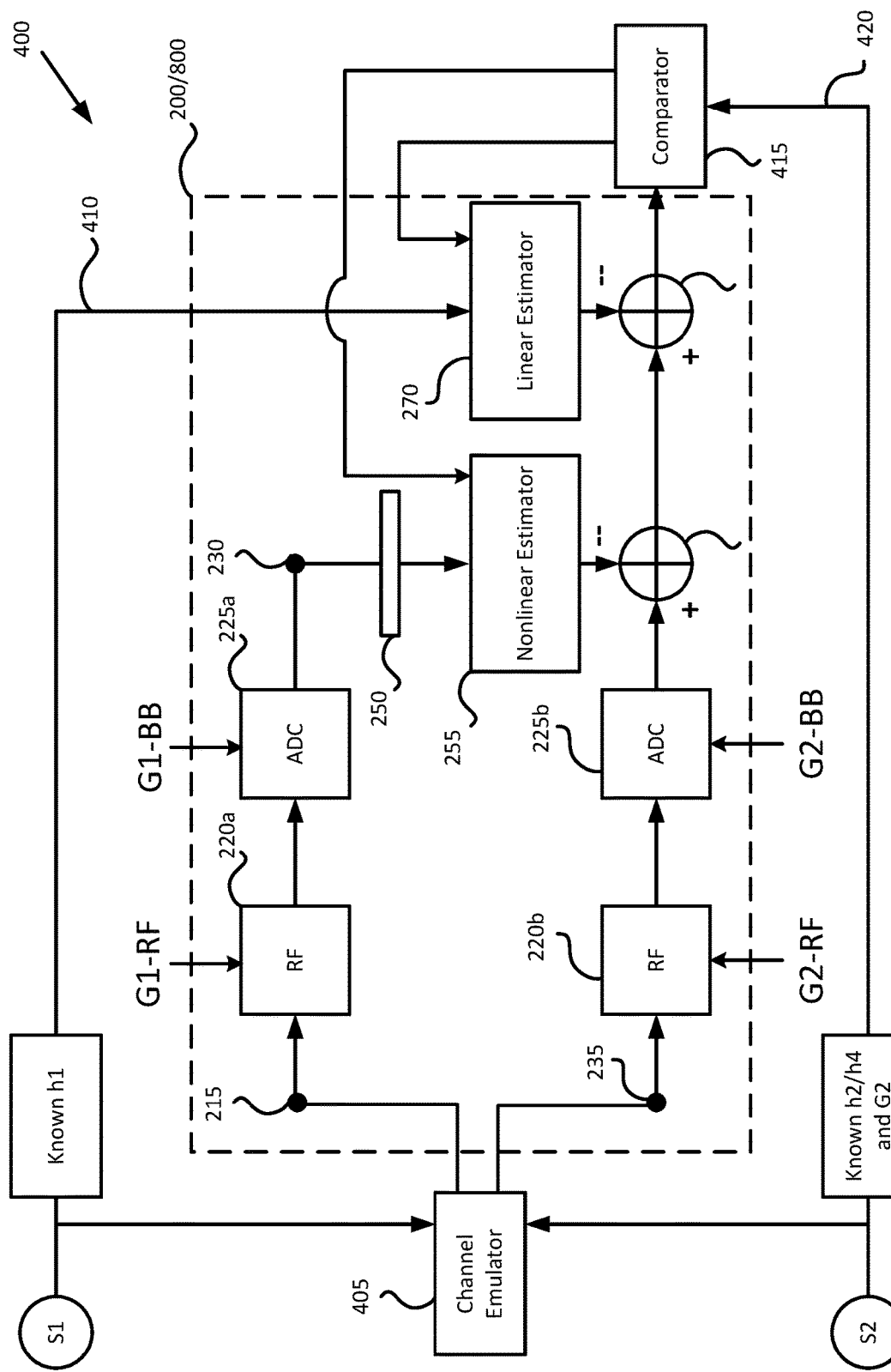
FIG. 4 illustrates an offline training circuit for a de-collider, according to aspects of the present disclosure.
Figure 8A:
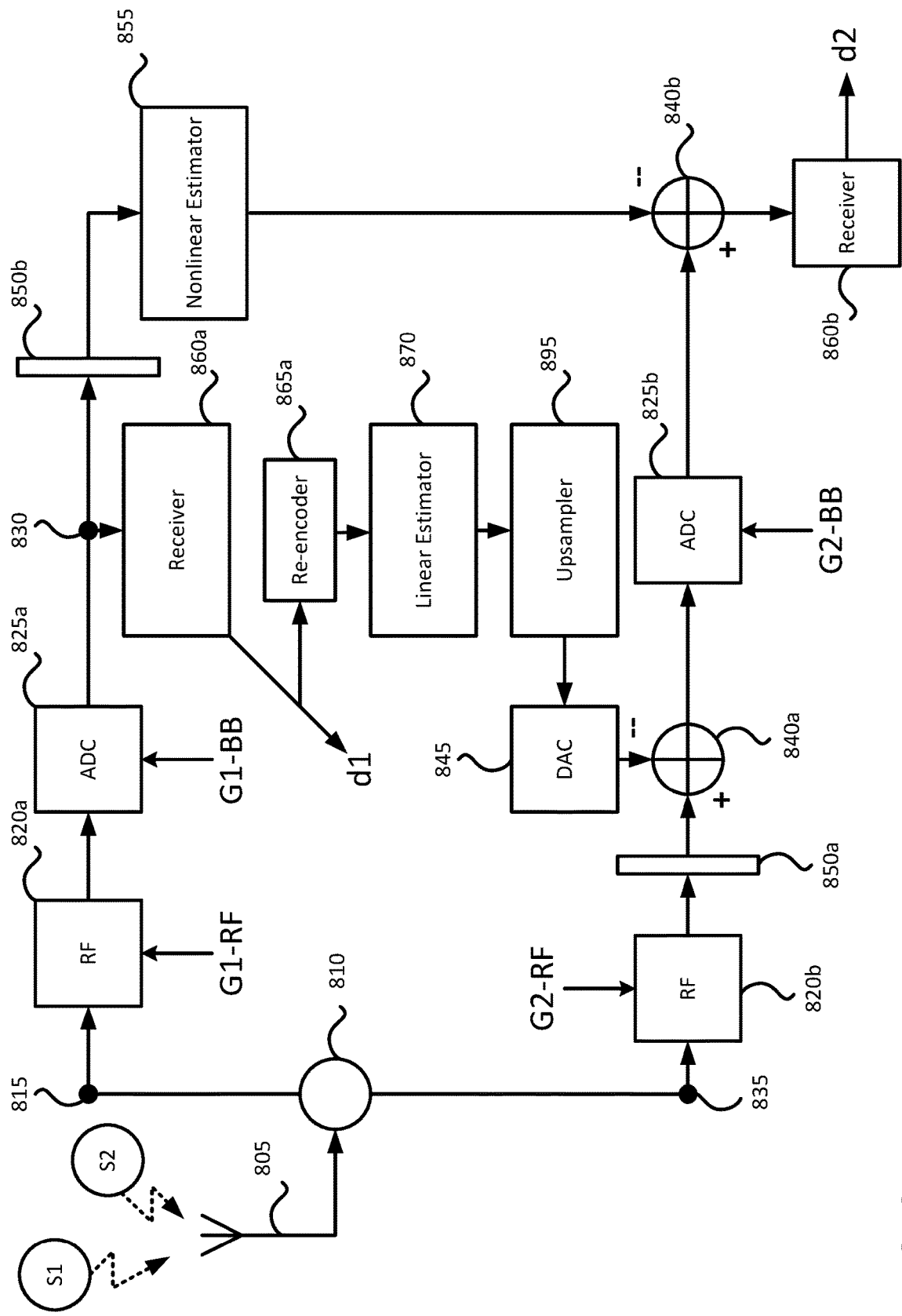
FIGS. 8A and 8B illustrate embodiments of an analog/digital de-collider, according to aspects of the present disclosure.
Figure 8B:
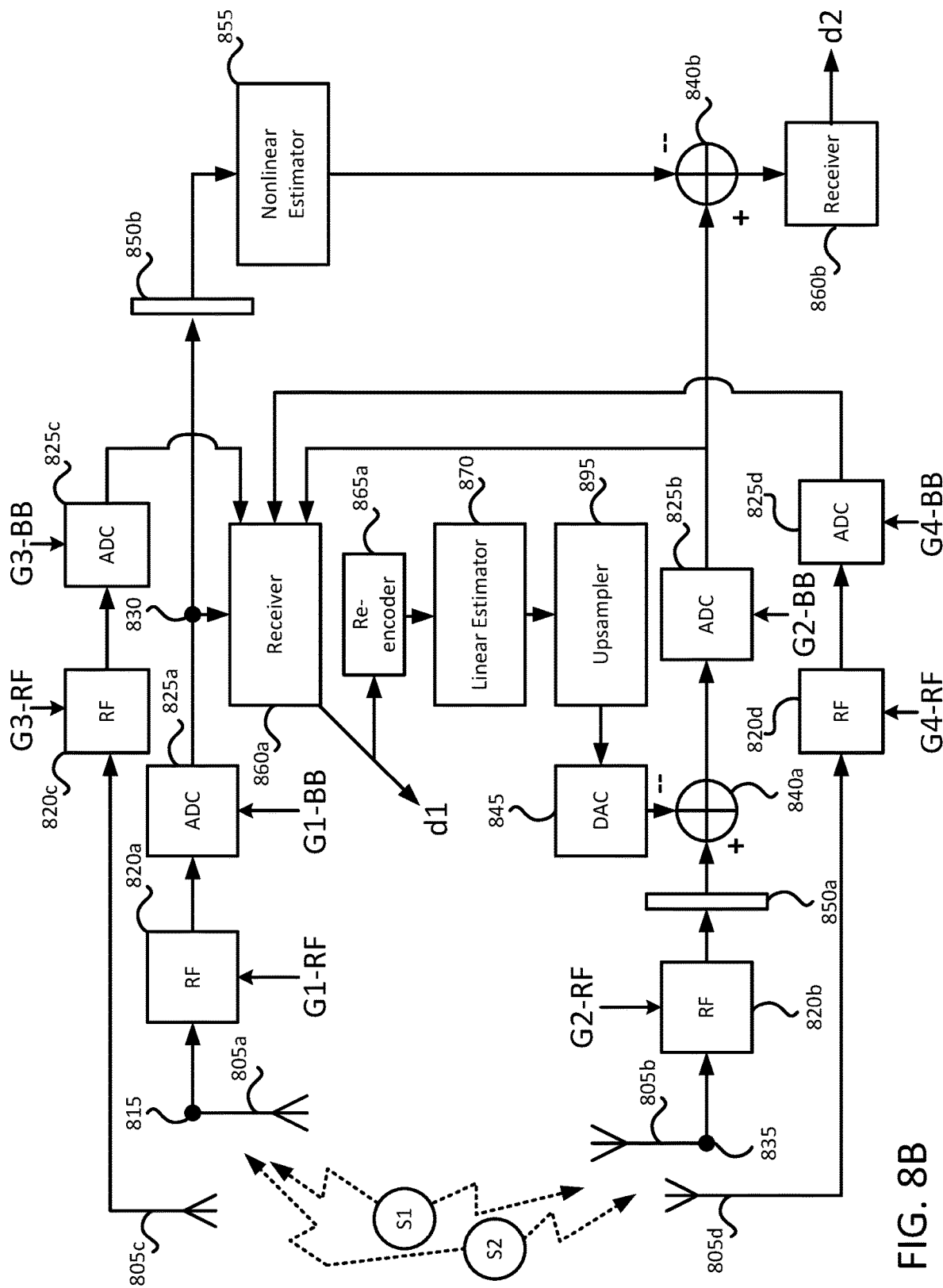

FIG. 4 illustrates an offline training circuit 400 for a digital/digital de-collider 200 as described in relation to FIGS. 2A and 2B or an analog/digital de-collider 800 as described in relation to FIGS. 8A and 8B. Although the offline training circuit 400 illustrated in FIG. 4 is shown connected to a digital/digital de-collider 200, any reference to a digital/digital de-collider 200 or a component thereof (e.g., antenna 205, nonlinear estimator 255) may be understood to apply to an analog/digital de-collider 800 or a component thereof (e.g., antenna 805, nonlinear estimator 855). In various embodiments, the offline training circuit 400 is provided by an external test device during initial setup and training of the de-collider 200, or may be integrated components of the de-collider 200 that the de-collider 200 may selectively engage to initiate an offline training session.

The training circuit 400 includes a channel emulator 405, which may incorporate or bypass the splitter 210 of the de-collider 200, which is connected to the first node 215 and the third node 235. The channel emulator 405 receives a first known signal from a first signal source S1, and a second known signal from a second signal source S2, and emulates channel effects $h_1$ and $h_2$ on the known signals transmitted to each of the first signal pathway and the second signal pathway. In embodiments training to use a single, shared antenna 205 (e.g., as in FIG. 2A) the channel emulator 405 transmits a first collided signal $s_{1c}(t)$ to the first node 215 and a second collided signal $s_{2c}(t)$ to the third node 235 according to Formula 3a. In embodiments training to use a first antenna 205a and a second antenna 205b (e.g., as in FIG. 2B) the channel emulator 405 transmits a first collided signal $s_{1c}(t)$ to the first node 215 according to Formula 2b and a second collided signal $s_{2c}(t)$ to the third node 235 according to Formula 3b.

As illustrated, a bypass pathway 410 connects the first signal source S1 to the input of the linear estimator 270 (bypassing the first receiver 260a and re-encoder 265 of FIGS. 2A and 2B). In other embodiments, the bypass pathway 410 connects the first node 215 with the input of the linear estimator 270. The bypass pathway 410 carries the first known signal $s_1(t)$ as affected by the known simulated first channel effects $\hat{h}_1(t)$, without the first receiver 260a and re-encoder 265 interpreting the first digitized signal $s_{1d}[n]$ into the first decoded packet d1 and re-encoding the first decoded packet d1 into a first estimated digital signal $s_{1e}[n]$.

The (temporary or switched) removal of the first receiver 260a and re-encoder 265 from the de-collider 200 by the bypass pathway 410 may affect the relative speeds at which the nonlinear estimator 255 and the linear estimator 270 produce outputs. Therefore, the de-collider 200 may adjust a length of delay imposed by the first digital delay 250 when the offline training circuit 400 is activated relative to when the offline training circuit 400 not activated.

In embodiments in which the linear estimator 270 is not (re)trained in an offline training session, the bypass pathway 410 may bypass the linear estimator 270 and connect directly to the subtrahend input of the second subtractor 245 in place of the output from the linear estimator 270.

The first collided signal $s_{1c}(t)$ and the second collided signal $s_{2c}(t)$ are processed as is discussed in relation to FIGS. 2A and 2B to produce the second de-interfered signal $s_{2i}[n]$ according to Formula 10a or 10b respectively by subtracting the output of the linear estimator 270 and the nonlinear estimator 255 from the second digitized signal $s_{2d}[n]$.

As illustrated, a check pathway 420 connects the second signal source S2 to a comparator 415. In other embodiments, the check pathway 420 connects the third node 235 with the comparator 415. In embodiments training to use a single, shared antenna 205 (e.g., as in FIG. 2A) the check pathway 420 carries the second known signal $s_2(t)$ as affected by the known simulated second channel effects $h_2(t)$. In embodiments training to use a first antenna 205a and a second antenna 205b (e.g., as in FIG. 2B), the check pathway 420 carries the second known signal $s_2(t)$ as affected by the known simulated fourth channel effects $h_4(t)$.

The comparator 415 determines the difference between the second known signal as affected by the relevant known channel effect $h_2(t)$ or $h_4(t)$ and the second de-interfered signal $s_{2i}[n]$ to identify how the nonlinear estimator 255 and the linear estimator 270 performed in identifying the interference components of the first packet on the second packet in the simulated collided signals. The comparator 415 provides a back error propagation signal to the nonlinear estimator 255 to train how the different nodes in the neural network are weighted to estimate the nonlinear interference component. The comparator 415 provides a least means squared training signal to the linear estimator 270 to adjust how the linear estimator 270 determines how the first signal $s_1(t)$ would affect the second digital signal $s_{2d}[n]$ (e.g., $G2 * \hat{h}_1[n] * \hat{s}_1[n]$ or $G2 * \hat{h}_3[n] * \hat{s}_1[n]$).

Figure 5:
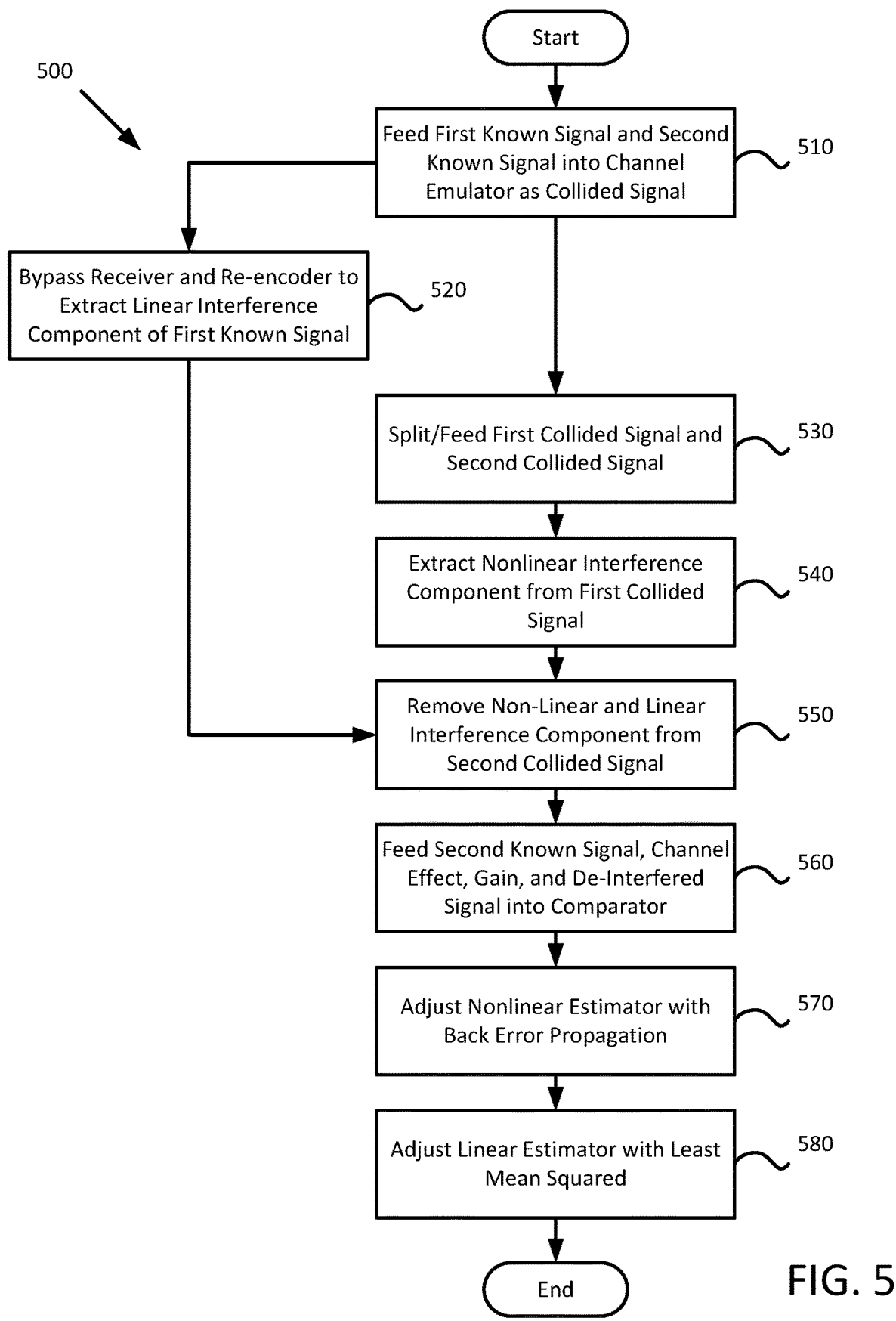
FIG. 5 is a flowchart of a method for offline training of a de-collider using an offline training circuit, according to aspects of the present disclosure.

FIG. 5 is a flowchart of a method 500 for offline training of a de-collider 200/800, as may be practiced with a de-collider 200/800 using an offline training circuit 400 as described in relation to FIG. 4. Method 500 begins with block 510, where a first known signal source feeds a first known signal carrying a first known packet and a second known signal source feeds second known signal carrying a second known packet to a channel emulator 405.

At block 520, the offline training circuit 400 bypasses the first receiver 260*a* and the re-encoder 265 to provide the first known signal directly to the linear estimator 270 to determine the linear interference component of the first known signal on the second known signal.

At block 530, the channel emulator 405 feeds the collided known signals onto the first and second signal paths as respective first and second collided signals (e.g., $s_{1c}(t)$ and $s_{2c}(t)$). The channel emulator 405 places a first collided signal onto the first signal pathway at the first node 215 with an emulated first channel effect (e.g., $h_1(t)$) affecting the first known signal, and an emulated second channel effect (e.g., $h_2(t)$) affecting the second known signal. In some embodiments (e.g., to train a single-antenna de-collider 200/800), the channel emulator 405 places a second collided signal onto the second signal pathway at the third node 235 with the same emulated first and second channel effects affecting the first and second known signals as the first collided signal. In other embodiments (e.g., to train a multi-antenna de-collider 200/800), the channel emulator 405 places a second signal onto the second signal pathway at the third node 235 with an emulated third channel effect (e.g., $h_3(t)$) affecting the first known signal, and an emulated fourth channel effect (e.g., $h_4(t)$) affecting the second known signal.

At block 540, the de-collider 200 extracts the (training) nonlinear interference component (e.g., $\hat{f}_{2NL}(h_1[n]*s_1[n], h_2[n]*s_2[n])$ or $\hat{f}_{2NL}(h_3[n]*s_1[n], h_4[n]*s_2[n])$) from the first collided signal. As in normal operations (e.g., per method 300 or method 900), the de-collider 200 amplifies and digitizes the first collided signal (e.g., to produce a first digitized signal $s_{1d}[n]$) on the first signal pathway, and feeds the digitized first signal to a nonlinear estimator 255. In various embodiments, the de-collider 200 uses a FFANN as a nonlinear estimator 255 to estimate the real and imaginary components of a given time or time window for the nonlinear interference component of the encoded first packet on the encoded second packet. In various embodiments, during normal operations, the output of the nonlinear interference component is delayed based on the processing time to extract the estimated linear interference component (e.g., according to block 340 and block 360 in method 300), but the delay in method 500 may be set for a time less than that used in methods 300 and 900, as the offline training circuit 400 bypasses the first receiver 260*a* and the re-encoder 265.

At block 550, the de-collider 200 removes the (training) linear and nonlinear interference components from the second collided signal on the second signal pathway to produce a (training) de-interfered second signal. In various embodiments, the linear interference component is removed as an analog signal from an analog second collided signal before digitizing the second collided signal (as a partially de-interfered signal) and removing the nonlinear interference component. In other embodiments, the linear and nonlinear interference components are removed as digital signals from a digital second collided signal.

At block 560, the offline training circuit 400 feeds the second known signal, the channel effects (e.g., $h_2(t)$ or $h_4(t)$) and gains applied on the second signal pathway to the comparator 415, and the de-collider 200 feeds the de-interfered second signal to the comparator 415. The comparator 415 determines the difference between the de-interfered second signal and the ideal second known signal based on the known channel effects and gains applied to the signals (e.g., the residual error or noise on the second signal pathway). At block 570, the comparator 415 adjusts the nonlinear estimator 255 via a back error propagation of the difference to the neural network. At block 580, the comparator adjusts the linear estimator 270 via least mean squared difference. Method 500 may then conclude or repeat for additional rounds of training.

Figure 6:
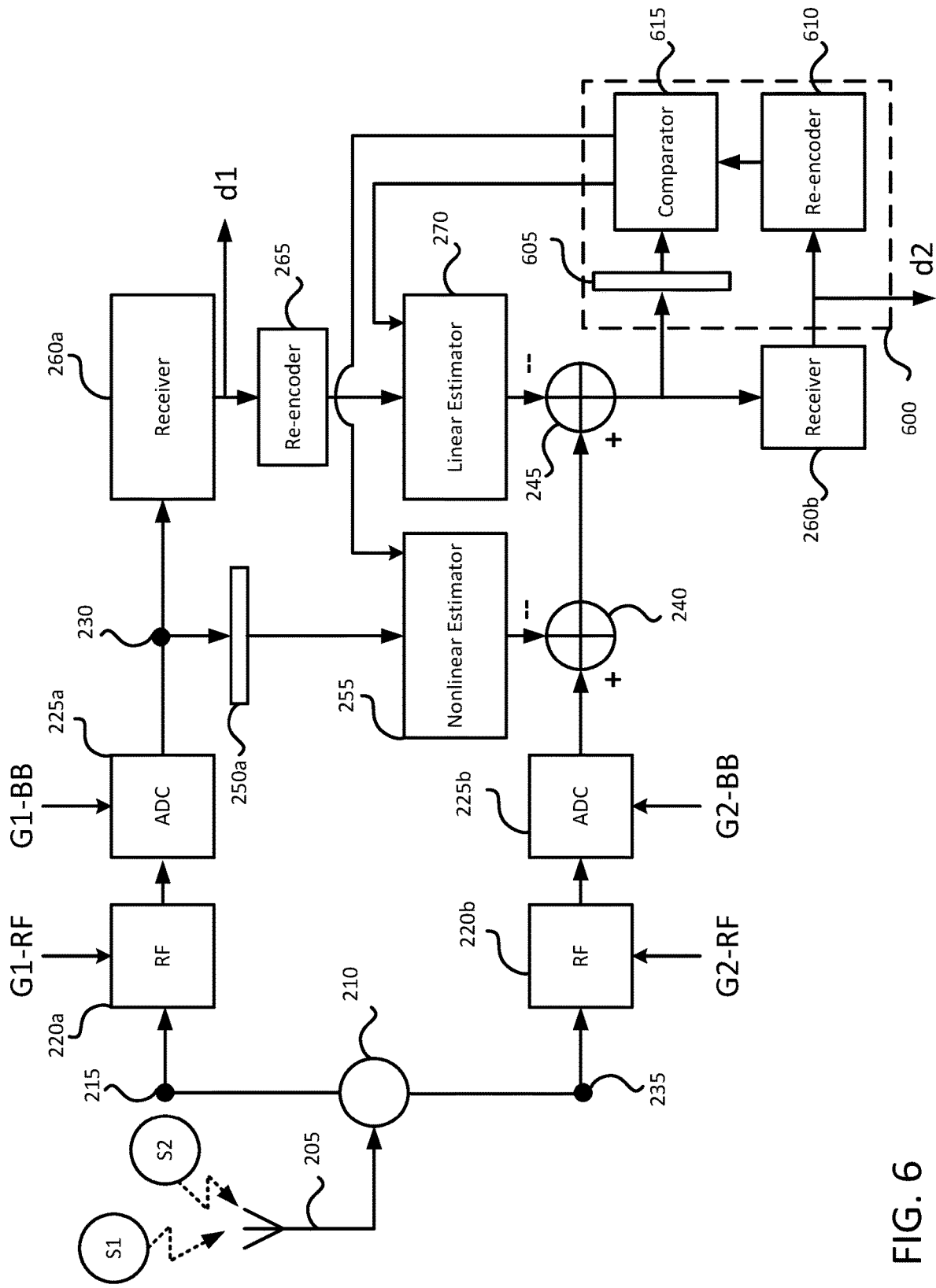
FIG. 6 illustrates an online training circuit for a de-collider, according to aspects of the present disclosure.

FIG. 6 illustrates an online training circuit 600 for a digital/digital de-collider 200 as described in relation to FIGS. 2A and 2B or an analog/digital de-collider 800 as described in relation to FIGS. 8A and 8B. Although the online training circuit 600 illustrated in FIG. 6 is shown connected to a digital/digital de-collider 200, any reference to a digital/digital de-collider 200 or a component thereof (e.g., antenna 205, linear estimator 270) may be understood to apply to an analog/digital de-collider 800 or a component thereof (e.g., antenna 805, nonlinear estimator 855).

Figure 9:
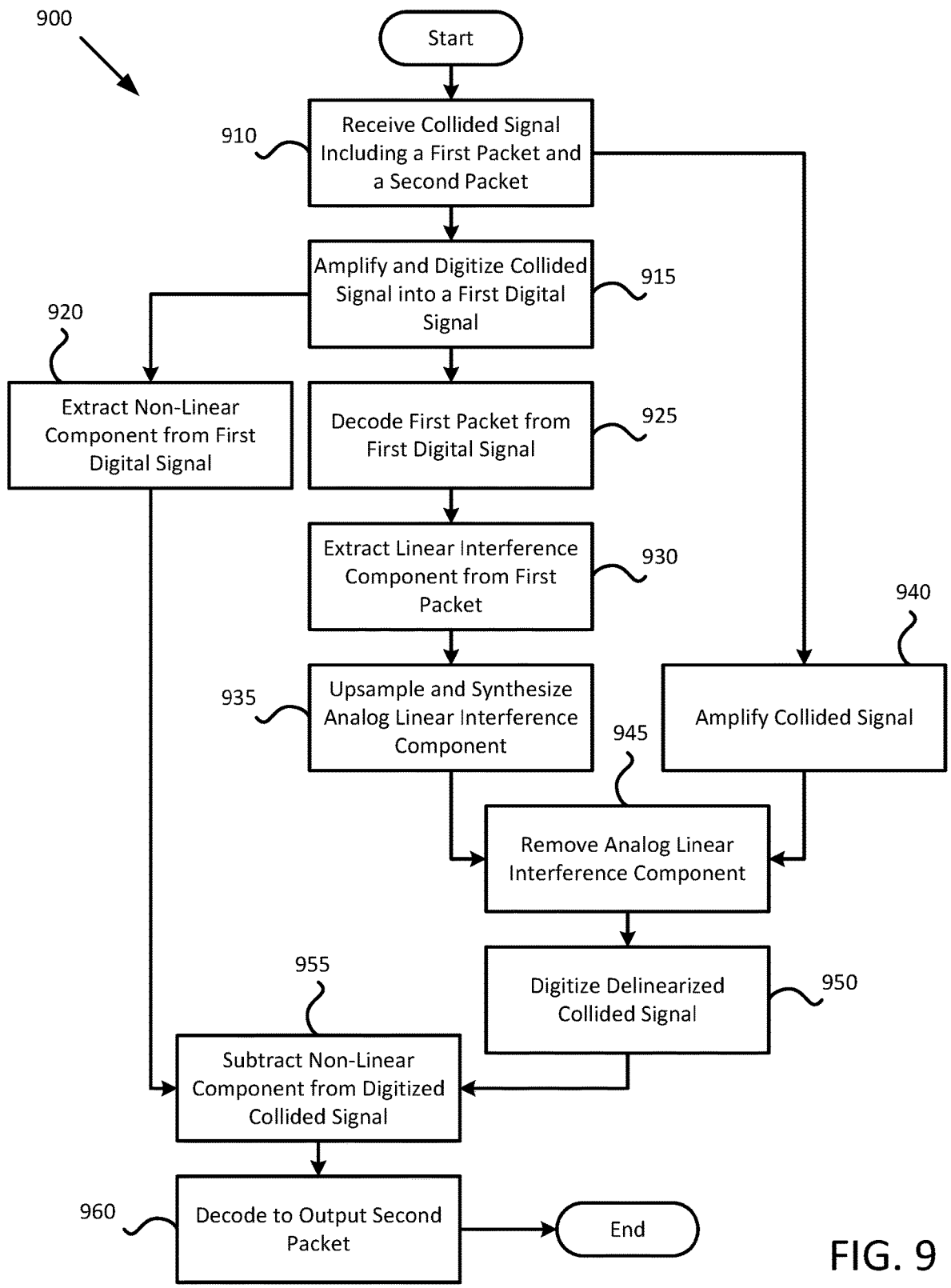
FIG. 9 is a flowchart of a method for de-colliding signals, as may be practiced with an analog/digital de-collider, according to aspects of the present disclosure.

Live signals, having values that are unknown to the de-collider 200 prior to decoding and de-colliding, are de-coded and de-collided as discussed in relation to method 300 in FIG. 3 or method 900 in FIG. 9, and the resulting outputs are used to train the nonlinear estimator 255 and the linear estimator 270. Although FIG. 6 illustrates the online training circuit 600 applied to the outputs of a de-collider 200 using a single, shared antenna 205 as in FIG. 2A, the online training circuit 202 may be applied to the outputs of a de-collider 200 using multiple antennas 205, as in FIG. 2B (as well as the analog/digital de-colliders 800 illustrated in FIGS. 8A and 8B).

The online training circuit 600 accepts the decoded second packet d2 and the de-interfered second signal $s_{2i}[n]$ from the de-collider 200 as inputs. A second re-encoder 610 re-encodes the decoded second packet d2 into a second estimated digital signal $s_{2e}[n]$ that estimates or approximates the second or fourth channel effect $h_2[n]$ or $h_4[n]$ (as $\hat{h}_2[n]$ or $\hat{h}_4[n]$, respectively) and the second component signal $s_2[n]$ (as $\hat{s}_2[n]$) that produced the decoded second packet d2, which may be represented according to Formula 11a in embodiments using one antenna 205, or according to Formula 11b in embodiments using multiple antennas 205.

$$s_{2e}[n]=G2*\hat{h}_2[n]*\hat{s}_2[n] \quad (11a)$$

$$s_{2e}[n]=G2*\hat{h}_4[n]*\hat{s}_2[n] \quad (11b)$$

A second digital delay 605 receives and synchronizes the de-interfered second signal $s_{2i}[n]$ with the output of the second re-encoder 610 to account for the time for the second receiver 260*b* and the second re-encoder 610 to process the decoded second packet d2. For example, if the de-collider 200 outputs the second de-interfered signal $s_{2i}[n]$ at time $t_0$ and the second receiver 260*b* and the second re-encoder 610 process the second de-interfered signal $s_{2i}[n]$ to produce a second estimated digital signal $s_{2e}[n]$ at time $t_1$, the second digital delay 605 delays the output of the second de-interfered signal $s_{2i}[n]$ to the comparator 615 by $(t_1-t_0)$. In various embodiments, the second digital delay 605 may be a discrete or an integrated component (e.g., a first-in-first-out register).

The comparator 615 determines the difference between the second estimated digital signal $s_{2e}[n]$ and the second de-interfered signal $s_{2i}[n]$ as delayed to identify how the nonlinear estimator 255 and the linear estimator 270 performed in identifying the interference components of the first packet on the second packet in the simulated collided signals. The comparator 615 provides a back error propagation signal to the nonlinear estimator 255 to train how the different nodes in the neural network are weighted to estimate the nonlinear interference component. The comparator 615 provides a least means squared training signal to the linear estimator 270 to adjust how the linear estimator 270 determines how the first signal s1(t) would affect the second digital signal $s_{2d}[n]$ (e.g., $G2*\hat{h}_1[n]*\hat{s}_1[n]$ or $G2*\hat{h}_3[n]*\hat{s}_1[n]$).

Figure 7:
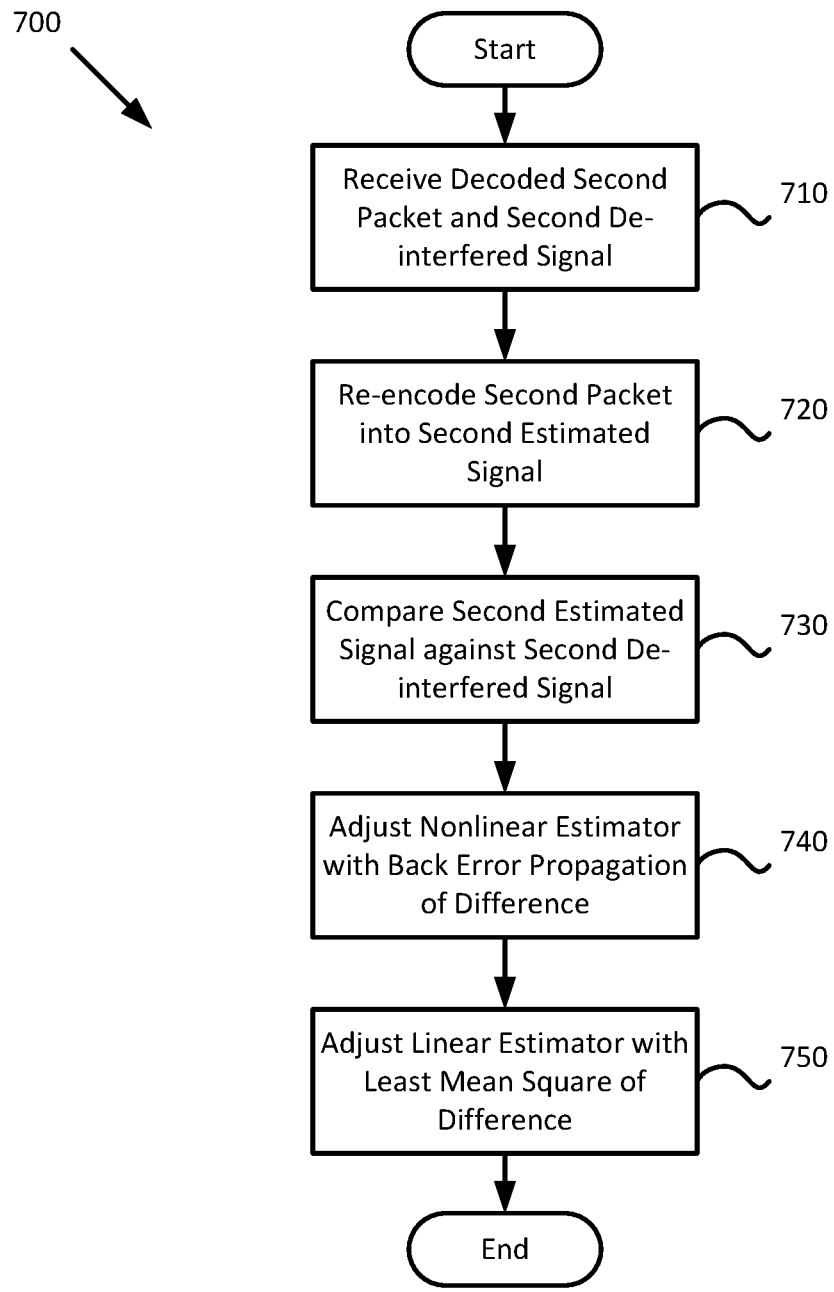
FIG. 7 is a flowchart of a method for online training of a de-collider, according to aspects of the present disclosure.

FIG. 7 is a flowchart of a method 700 for online training of a digital/digital de-collider 200 or analog/digital de-collider 800, as may be practiced with a de-collider 200 in an online training arrangement as described in relation to FIG. 6. Method 700 begins with block 710, where the online training circuit 600 receives a decoded second packet (e.g., d2) and the de-interfered second signal (e.g., $s_{2i}[n]$) from the output of normal operations of the de-collider 200 (e.g., method 300 or method 900). During online training, the de-collider 200 receives live signals with values that are unknown to the de-collider 200 prior to decoding and de-colliding.

At block 720, the online training circuit 600 re-encodes the decoded packet into a second estimated digital signal (e.g., $s_{2e}[n]$) that approximates both the second/fourth channel effect (e.g., $\hat{h}_2(t)$ or $\hat{h}_4(t)$) and the second component signal (e.g., $\hat{s}_2(t)$) as received in the collided signal.

At block 730, the online training circuit 600 compares the second estimated digital signal against the second de-interfered signal. In various embodiments, to compensate for the time needed to decode and re-encode the second packet into the second estimated digital signal $s_{2e}[n]$, the online training circuit 600 delays (e.g., via a digital delay 605) the second de-interfered signal $s_{2i}[n]$ to match the time windows of each signal. The comparator 615 determines the difference between the second estimated digital signal and the second de-interfered signal. At block 740, the comparator 415 adjusts the nonlinear estimator 255 via back error propagation of the difference to the neural network. At block 750, the comparator 615 adjusts the linear estimator 270 via least mean square of the difference. Method 700 may then conclude or repeat for additional rounds of training.

FIGS. 8A and 8B illustrate embodiments of an analog/digital de-collider 800. FIG. 8A illustrates a de-collider 800 using a single, shared antenna 805, and FIG. 8B illustrates a de-collider 800 using a first antenna 805a and a second antenna 805b (generally, antennas 805). The antennas 805 are illustrated as receiving the component signals from a first signal source S1 and a second signal source S2. Several elements of the analog/digital de-collider 800 are implemented as hardware components (e.g., antennas 805, splitter 810), while others may be implemented as hardware or as specialized computing components running software/firmware to perform the recited functionalities described herein (e.g., receiver 860, re-encoder 865, linear estimator 870).

In FIG. 8A, the first component signal $s_1(t)$, from the first signal source S1, is subject to first channel conditions $h_1(t)$ (e.g., interference, noise, path losses) and the second component signal $s_2(t)$ from the second signal source S2 is subject to second channel conditions $h_2(t)$, such that the collided signal $S_{collided}(t)$ received by the antenna 805 may be represented according to Formula 12.

$$S_{collided}(t)=h_1(t)*s_1(t)+h_2(t)*s_2(t) \quad (12)$$

A splitter 810 in communication with the antenna 805 in FIG. 8A splits the collided signal $S_{collided}(t)$ onto a first signal pathway and onto a second signal pathway. In various embodiments, the splitter 810 is a Y-splitter splits the collided signal $S_{collided}(t)$ into two substantially equal (±10%) amplitude signals, although in other embodiments, the amplitudes of the first and second signals may be unevenly split by the splitter 810. The first collided signal $s_{1c}(t)$ and the second collided signal $s_{2c}(t)$ carried on the respective first and second signal pathways may thus be represented according to Formula 13a and optionally according to Formula 14a in the embodiment illustrated in FIG. 8A.

$$S_{collided}(t)=s_{1c}(t)+s_{2c}(t) \quad (13a)$$

$$s_{1c}(t)\approx s_{2c}(t)\approx 0.5(h_1(t)*s_1(t)+h_2(t)*s_2(t)) \quad (14a)$$

In FIG. 8B, the first component signal $s_1(t)$, from the first signal source S1, is subject to first channel conditions $h_1(t)$ (e.g., interference, noise, path losses) and the second component signal $s_2(t)$ from the second signal source S2 is subject to second channel conditions $h_2(t)$, such that the first collided signal $s_{1c}(t)$ received by the first antenna 805a and the first signal pathway may be represented according to Formula 13b. The second antenna 805b, however, is spatially distinct from the first antenna 805a, and the first component signal $s_1(t)$ may be subject to third channel conditions $h_3(t)$ different from the first channel conditions $h_1(t)$, and the second component signal $s_2(t)$ may be subject to fourth channel conditions $h_4(t)$ different from the second channel conditions $h_2(t)$ such that the second collided signal $s_{2c}(t)$ received by the second antenna 805b and the second signal pathway may be represented according to Formula 14b.

$$s_{1c}(t)=h_1(t)*s_1(t)+h_2(t)*s_2(t) \quad (13b)$$

$$s_{2c}(t)=h_3(t)*s_1(t)+N(t)*s_2(t) \quad (14b)$$

In FIGS. 8A and 8B, the first signal pathway includes a first node 815 and a second node 830, between which a first amplifier 820a (generally, amplifier 820) and a first ADC 825a (generally, ADC 825) are connected. The first amplifier 820a applies a gain of G1-RF to the first collided signal $s_{1c}(t)$, and the first ADC 825a digitizes the first collided signal $s_{1c}(t)$ and applies a baseband gain of G1-BB to the collided signal $s_{1c}(t)$ to produce a first digitized signal $s_{1d}[n]$. The overall gain G1 on the first signal pathway may be represented according to Formula 15.

$$G1=G1\text{-}RF*G1\text{-}BB \quad (15)$$

The non-linearities of the respective signal paths may be may be included in the respective digitized signal as a respective nonlinear interference component $f_{1NL}$ or $f_{2NL}$. Any noise in the respective signal paths, amplifiers 820, and ADCs 825 for a particular pathway may be included in the respective digitized signal as component $v_1$ or $v_2$. Accordingly, a first digitized signal $s_{1d}[n]$ may be represented according to Formula 16 in FIGS. 8A and 8B.

$$s_{1d}[n]=G_1*(h_1[n]*s_1[n]+h_2[n]*s_2[n])+f_{1NL}(h_1[n]*s_1[n],h_2[n]*s_2[n])+v_1 \quad (16)$$

In contrast to the first signal pathway, the second signal pathway includes a third node 835 and a fourth node of a first subtractor 840a, between which a second amplifier 820b and an analog delay 850a (generally, delay 850) are connected. The second amplifier 820b applies a gain of G2-RF to the second collided signal $s_{2c}(t)$, and the analog delay 850a synchronizes the output of the second amplifier 820b with the determination of the linear interference component so that the second signal pathway removes the linear interference components of the same time window from the second collided signal $s_{2c}(t)$. In various embodiments, the analog delay 850a may be located before or after the second amplifier 820 on the second signal pathway.

A de-collider 800 using multiple antennas 805 may optionally include a number of supplemental antennas 805 (which correspond to an equal number of supplemental signal pathways that feed into the first receiver 860a and include an amplifier 820 and an ADC 825), depending on the number of spatially multiplexed packets expected to be received on the main antennas (e.g., first antenna 805a and second antenna 805b). The total quantity of antennas 805 employed $Q_{Antennas}$, should be at least equal to (but may be greater than) $1.5*(m_1+m_2)+1$, where $m_1$ is the number of spatially multiplexed signals in a first packet, and $m_2$ is the number of spatially multiplexed signals in a second packet. As illustrated in FIG. 8B, $Q_{Antennas}$ is set to four, as one packet is received at the first antenna 805a (i.e., $m_1=1$) and one packet is received at the second antenna 805b (i.e., $m_2=1$), but more than four antennas 205 may be used in other embodiments. Accordingly, as illustrated in FIG. 8B, a third signal pathway is associated with a third antenna 805c, a third amplifier 820c, and a third ADC 825c that provide a third digitized signal $s_{3d}[n]$ to the first receiver 860a, and a fourth signal pathway is associated with a fourth antenna 805d, a fourth amplifier 820d, and a fourth ADC 825d that provide a fourth digitized signal $s_{4d}[n]$ to the first receiver 860a. In embodiments where more packets are collided, more supplemental antennas 805 and corresponding supplemental signal pathways may be employed (not illustrated). As will be appreciated, each of the signals received by and processed on the supplemental signal pathways are affected by different channel effects, $h_x(t)$, and accordingly each supplemental signal pathway may apply a different gain Gx (i.e., Gx-RF*Gx-BB) based on the operational range of the associated ADC 825 and the received signal strength, which may be set independently of G1 or G2. Although not illustrated, the supplemental signal pathways may include an analog or a digital delay element to temporally align the inputs to the first receiver 260a to the output from the first ADC 825a or the second ADC 825b.

An analog interference determination pathway connects the first signal pathway at the second node 830 with the second signal pathway at the fourth node/first subtractor 840a. A first receiver 860a (generally, receiver 860), a first re-encoder 865a (generally, re-encoder 865), a linear estimator 870, an optional upsampler 895, and a Digital-to-Analog Converter (DAC) 845 are connected between the second node 830 and the first subtractor 840a.

When using a single shared antenna, as in FIG. 8A, the first receiver 860a accepts the first digitized signal $s_{1d}[n]$ and decodes the first packet onto a first output as decoded first packet d1. When using multiple antennas 205, as in FIG. 8B, the first receiver 260a accepts the first digitized signal $s_{1d}[n]$ and the second digitized signal $s_{2d}[n]$ and any supplemental digitized signals to decode the first packet as a decoded first packet d1. As illustrated in FIG. 2B, the first receiver 260a receives a third digitized signal $s_{3d}[n]$ and a fourth digitized signal $s_{4d}[n]$ as supplemental digitized signals, but other embodiments may receive more supplemental digitized signals. The first re-encoder 865a re-encodes the decoded first packet d1 into a first estimated digital signal $s_{1e}[n]$ that estimates or approximates the first channel effect $h_1[n]$ (as $\hat{h}_1[n]$) and the first component signal $s_1[n]$ (as $\hat{s}_1[n]$) that produced the decoded first packet d1, which may be represented according to Formula 17.

$$s_{1e}[n]=\hat{h}_1[n]*\hat{s}_1[n] \quad (17)$$

As will be appreciated, the first channel effect and the associated estimated first channel effect ($h_1[n]$ and $\hat{h}_1[n]$) may be different from one another. Similarly, the first component signal and the associated estimated first component signal ($s_1[n]$ and $\hat{s}_1[n]$) may be different from one another. The differences in the estimated and actual values for the first channel effect and first component signal may be the result of noise in the first signal pathway (e.g., $v_1$ or $h_2[n]*s_2[n]$) or non-linearities introduced by the first ADC 825a (e.g., $f_{1NL}[n]$), and the re-encoder 865 may be more accurate when the SNR on the first signal pathway is lower and the receiver 860 can more accurately decode the first packet.

The linear estimator 870 receives the first estimated digital signal $s_{1e}[n]$ and applies the gain G2-RF to the first estimated signal $s_{1e}[n]$ so that the de-collider 800 may remove the (estimated) effects of the first component signal $s_1(t)$ from the second signal pathway. The linear estimator 870 may be trained offline (i.e., using known input signals as per method 500 discussed in relation to FIG. 5) or online (i.e., using "live" or unknown input signals as per method 700 in relation to FIG. 7).

The optional upsampler 895 increases the sampling rate of the output of the linear estimator 870. In some embodiments, the upsampler 895 produces an expanded version in which the upsampled values match the output values, changing when the output value changes. For example, from time $t_0$ to $t_3$, the output of the linear estimator 870 may be $s_{1e}[n_0]=1/$TRUE and from time $t_4$ to $t_7$ may be $s_{1e}[n_1]=0/$FALSE, and the upsampler 895 produces expanded series of [1, 1, 1, 1, 0, 0, 0, 0] from time $t_0$-$t_7$ that includes more values (e.g., four instances of 1/TRUE and four instances of 0/FALSE as opposed to one instance of each) to allow for the DAC 845 to manipulate more data when synthesizing an analog signal from a digital signal.

The DAC 845 synthesizes the first estimated signal $s_{1e}[n]$ into an analog linear interference component $s_{1e}(t)$, which the first subtractor 840a subtracts from the second collided signal $s_{1c}(t)$ (as delayed and amplified) to produce a partially de-interfered second signal $s_{2p}(t)$. The first subtractor 840a includes a first minuend input, that accepts the delayed and amplified second collided signal G2-RF*$s_2[n]$, and a first subtrahend input that accepts the estimated analog linear interference component $s_{1e}(t)$. Each of the subtractors 840 may be multiplexers that provide signals at the subtrahend inputs to negatively interfere with (e.g., cancel out a portion of) the signal input at the minuend inputs. The partially de-interfered second signal $s_{2p}(t)$ may be represented according to Formula 18.

$$s_{2p}(t)=\text{G2-RF}*s_{2c}(t)-\text{G2-RF}*\hat{h}_1[n]*\hat{s}_1[n] \quad (18)$$

The gain G2-RF applied by the second amplifier 820b in various embodiments is selected to be greater than the gain G1 applied on the first signal pathway to preserve the relative positive/negative values of the second collided signal $s_{2c}(t)$ in the partially de-interfered second signal $s_{2p}(t)$ when the analog linear interference component $s_{1e}(t)$ is removed by the first subtractor 840a (i.e., G1<G2-RF).

A digital interference determination pathway connects the first signal pathway at the second node 830 with the second signal pathway at the fifth node/second subtractor 840b. The digital interference determination pathway includes a first digital delay 850b and a nonlinear estimator 855. The first digital delay 850b may be located before or after the nonlinear estimator 855 in various embodiments, and synchronizes the output of the determination of the nonlinear interference component with the determination of the linear interference component on the analog interference determination pathway so that the second signal pathway removes the nonlinear and linear interference components of the same time window from the second collided signals $s_{2c}(t)$. For example, if the nonlinear estimator 855 determines the nonlinear interference component of the first digitized signal $s_{1d}[n]$ at time $t_0$ and the analog interference determination pathway (including the first subtractor 840a and second ADC 825b) takes until time $t_1$ to remove the first synthesized signal $s_{1s}(t)$ from the second collided signal $s_{2c}(t)$ and digitize the output as the second digitized signal $s_{2d}[n]$, the first digital delay 850b delays the output of the nonlinear interference component by $(t_1-t_0)$. In various embodiments, the first digital delay 850b may be a discrete or an integrated component (e.g., a first-in-first-out register).

In various embodiments, the nonlinear estimator 855 is a FFANN. The nonlinear estimator 855 receives inputs of the first digitized signal $s_{1d}[n]$ over m time periods of n, and uses the current and historic values for $s_{1d}[n]$ to $s_{1d}[n-m]$ on the first signal pathway to estimate the nonlinear interference component of the first component signal $s_1[n]$ and the second component signal $s_2[n]$ on the second signal pathway. As new values for $s_{1d}[n]$ are received, the older values are cycled out (e.g., $s_{1d}[n]$ at time $t_0$ becomes $s_{1d}[n-1]$ at time $t_1$, which become $s_{1d}[n-2]$ at time $t_2$, etc.). The nonlinear estimator 855 weights the various input values, and the values of various hidden nodes that associate the various inputs together before producing the estimated nonlinear interference component for the second line $\hat{f}_{2NL}[n]$. In the de-collider 800 of FIG. 8A, $\hat{f}_{2NL}[n]$ may represent $\hat{f}_{2NL}(h_1[n]*s_1[n], h_2[n]*s_2[n])$, whereas in the de-collider of FIG. 8B, $\hat{f}_{2NL}[n]$ may represent $\hat{f}_{2NL}(h_3[n]*s_1[n], h_4[n]*s_2[n])$. The de-collider 800 may train the weights used by the nonlinear estimator 855 offline (i.e., using known input signals as per method 500 discussed in relation to FIG. 5) or online (i.e., using "live" or unknown input signals as per method 700 in relation to FIG. 7).

After the first subtractor 840a removes the analog linear interference component from the collided signal $s_{2c}(t)$ on the second signal pathway, the second ADC 825b digitizes the partially de-interfered signal $s_{2p}(t)$, and feeds the digitized partially de-interfered signal $s_{2p}[n]$ to the minuend input of the second subtractor 840b. The second subtractor 840b receives the nonlinear interference component $f_{2NL}[n]$ from the nonlinear estimator 855, and produces the de-interfered signal $s_{2i}[n]$ at the difference output, which may be represented according to Formula 19a or Formula 19b according to FIG. 8A or 8B respectively, where R represents a residual interference of the $f_{2NL}[n]$ on the second signal pathway (i.e., $f_{2NL}[n]-\hat{f}_{2NL}[n]$).

$$s_{2i}[n]=G2*h_2[n]*s_2[n]+v_2+R \quad (19a)$$

$$s_{2i}[n]=G2*h_4[n]*s_2[n]+v_2+R \quad (19b)$$

By removing the linear interference component as an analog signal $s_{1e}(t)$ prior to digitizing the second collided signal $s_{2c}(t)$, the de-collider 800 may set the gain G2-RF (e.g., a second gain) such that the amplitude of the partially de-interfered second signal $s_{2p}(t)$ is matched to the operating range of the second ADC 825b, allowing the de-collider to use a larger portion of the range of the second ADC 825b (compared to embodiments that feed a digitized version of the second collided signal $s_{2d}[n]$ to the subtractors 840), and thus reduce the noise $v_2$ introduced by the second ADC 825b. Additionally, the gain G2-BB applied by the second ADC 825b (e.g., a third gain) is selected so that the amplitude of the resulting de-interfered second signal $s_{2i}(t)$ preserves the relative positive/negative values of the second collided signal $s_{2c}(t)$ once the nonlinear interference is removed. In some embodiments, the gain G2-BB is set greater than the gain G1 applied on the first signal pathway according to Formula 20, while in other embodiments, the gain G2-BB is set is set according to Formula 21.

$$G1<G2\text{-BB} \quad (20)$$

$$\min(G2\text{-BB}*s_{2p}(t))-\max(G1*s_{1c}(t))>0 \quad (21)$$

The second receiver 860b receives the de-interfered second signal $s_{2i}[n]$ and decodes the second packet from the de-interfered second signal $s_{2i}[n]$ onto a second output as decoded first packet d2. In various embodiments, the first receiver 860a and the second receiver 860b are separate input channels of a single receiver 860, while in other embodiments, the first receiver 860a and the second receiver 860b are discrete receivers 860.

FIG. 9 is a flowchart of a method 900 for de-colliding signals, as may be practiced with a de-collider 200 as described in relation to FIGS. 8A and 8B. Method 900 begins with block 910, where the de-collider 800 receives a collided signal (e.g., $s_{collided}(t)$) that includes a first component signal (e.g., $s_1(t)$) carrying a first packet and a second component signal (e.g., $s_2(t)$) carrying a second packet. In some embodiments, the collided signal is received at a shared antenna 205 and is split into a first collided signal (e.g., $s_{1c}(t)$) on a first signal pathway and a second collided signal (e.g., $s_{2c}(t)$) on a second signal pathway. In other embodiments, the collided signal is received independently on each signal pathway by distinct antennas 205. For example, the collided signal is received at a first antenna 205a with a first channel effect (e.g., $h_1(t)$) from a first source (e.g., S1) affecting the first packet and a second channel effect (e.g., $h_2(t)$) from a second source (S2) affecting the second packet as a first collided signal on the first signal pathway while the collided signal is received at a second antenna 205b with a third channel effect (e.g., $h_3(t)$) from the first source affecting the first packet and a fourth channel effect (e.g., $h_4(t)$) from the second source affecting the second packet as a second collided signal on the second signal pathway.

At block 915, the de-collider 800, on a first signal pathway that includes a first amplifier 820a and a first ADC 825a, amplifies and digitizes the collided signal according to a first gain (e.g., G1) to produce a first digital signal (e.g., $s_{1d}[n]$).

At block 920, the de-collider 200 extracts a nonlinear component of interference of the first packet on the second packet in the collided signal (e.g., $\hat{f}_{2NL}(h_1[n]*s_1[n], h_2[n]*s_2[n])$ or $\hat{f}_{2NL}(h_3[n]*s_1[n], h_4[n]*s_2[n])$) from the first digital signal. In various embodiments, the de-collider 800 uses a FFANN as a nonlinear estimator 855 to estimate the real and imaginary components of a given time or time window for the nonlinear interference component of the encoded first packet on the encoded second packet. In various embodiments, the output of the nonlinear interference component estimated according to block 920 is temporally delayed based on the processing time to extract the estimated linear interference component (according to blocks 925-950 in method 900) so that the linear and nonlinear interference components are removed for the same time period from the second collided signal (according to blocks 945 and 955 in method 900).

At block 925, the de-collider 800 decodes the first packet from the first digital signal to produce a decoded first packet (e.g., d1). In various embodiments, the decoded first packet is provided as a first output of the de-collider 800. For example, a receiver 860 (e.g., an EVERSCALE™ receiver)

may attempt to decode both the first signal and the second signal from the collided signal.

At block 930, the de-collider 800 extracts the linear interference component of the first packet on the second packet in the collided signal (e.g., $G2*s_{1e}[n]$). To estimate the linear interference component, the de-collider 800 re-encodes the decoded first packet into a first estimated digital signal (e.g., $s_{1e}[n]$) that approximates both the first channel effect (e.g., $\hat{h}_1(t)$ or $\hat{h}_3(t)$) and the first component signal (e.g., $\hat{s}_1(t)$) as received in the collided signal, and feeds the estimated digital signal to a linear estimator 870. The linear estimator 870 extracts the linear component of interference of the first packet on the second packet in the collided signal from the estimated digital signal.

At block 935, the de-collider 800 upsamples and synthesizes the digital signal (e.g., $s_{1e}[n]$) carrying the digital linear interference component into an analog linear interference component (e.g., $s_{1e}(t)$).

At block 940, the de-collider 800, on a first signal pathway that includes a second amplifier 820b and a second ADC 825b, amplifies and delays the collided signal according (e.g., $s_{2c}(t)$) to a second RF gain (e.g., G2-RF) that is greater than the first gain to produce a second amplified analog signal (e.g., $G2\text{-}RF*s_{2c}(t)$).

At block 945, the de-collider 800 removes the analog nonlinear component of interference from the amplified second collided signal to produce a partially de-interfered signal (e.g., $s_{2p}(t)$). In various embodiments, a first subtractor 840a removes the analog nonlinear inference component. In various embodiments, the second RF gain is set so that the amplitude range of the resulting partially de-interfered signal is not greater than the operational range of the second ADC 825b.

At block 950, the de-collider 800 digitizes the partially de-interfered signal. In various embodiments, a second ADC 825b digitizes the partially de-interfered signal and applies a baseband gain during digitization (e.g., as $G2\text{-}BB*s_{2p}[n]$).

At block 955, the de-collider 800 removes the non-linear interference component (extracted per block 920) from the partially de-interfered digital signal. In various embodiments, a second subtractor 840b removes the non-linear interference component to produce a de-interfered digital signal (e.g., $s_{2i}[n]$).

At block 960, the de-collider 200 decodes the second packet from the de-interfered digital signal as a second decoded packet (e.g., d2). In various embodiments, the second decoded packet is provided as a second output of the de-collider 800. For example, a receiver 860 (e.g., an EVERSCALE™ receiver) may attempt to decode both the first signal and the second signal from the collided signal. In various embodiments, the second baseband gain is set so that the amplitude range of the resulting partially interfered signal is not greater than the operational range of the second receiver 860. Method 900 may then conclude.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system comprising:
 a first receiver pathway, configured to digitize and amplify a first collided signal including a first signal carrying a first packet collided with a second signal carrying a second packet at a first gain to produce a first digital signal;
 a second receiver pathway, configured to digitize and amplify a second collided signal including the first signal collided with the second signal at a second gain, greater than the first gain, to produce a second digital signal;
 a nonlinear estimator, configured to determine a nonlinear interference component of the first packet on the second packet from the first digital signal;
 a first receiver, configured to decode the first packet from the first digital signal;
 a re-encoder, configured to re-encode the first packet with an estimated first channel effect to produce an estimated signal;
 a linear estimator, configured to determine a linear interference component of the first packet on the second packet from the estimated signal;
 a subtractor, configured to remove the linear interference component and the nonlinear interference component from the second digital signal to produce a de-interfered signal; and
 a second receiver, configured to decode the second packet from the de-interfered signal.

2. The system of claim 1, further comprising:
 a shared antenna configured to receive a collided signal with a first channel effect on the first packet from a first source and a second channel effect on the second packet from a second source; and
 a signal splitter, connected to the shared antenna, configured to split the collided signal into the first collided signal onto the first receiver pathway and the second collided signal onto the second receiver pathway.

3. The system of claim 1, further comprising:
 a first antenna connected to the first receiver pathway, configured to receive a collided signal with a first channel effect on the first packet from a first source and a second channel effect on the second packet from a second source as the first collided signal; and
 a second antenna connected to the second receiver pathway, configured to receive the collided signal with a third channel effect on the first packet from the first source and a fourth channel effect on the second packet from the second source as the second collided signal.

4. The system of claim 1, further comprising:
 wherein the re-encoder is connected between the first receiver and the linear estimator; and
 a digital delay connected to the nonlinear estimator, configured to temporally align the first signal and the second signal at the subtractor.

5. The system of claim 1, further comprising an offline training circuit, comprising:
 a first simulated signal source, configured to produce a first known signal with a first known channel effect;
 a second simulated signal source, configured to produce a second known signal with a second known channel effect;
 a channel emulator, connected between the first simulated signal source and the second simulated signal source, and configured collide the first known signal with the second known signal to produce the first collided signal and the second collided signal during offline training;
 a bypass pathway, connecting the first simulated signal source with the linear estimator and to replace an output from the first receiver during offline training; and
 a comparator, connected to the second simulated signal source and a difference output of the subtractor during offline training, configured to transmit a least mean squared training signal to the linear estimator and a back error propagation training signal to the nonlinear estimator based on a difference between the de-interfered signal and the second known signal.

6. The system of claim 1, further comprising an online training circuit, comprising:
 a second re-encoder, connected to a second decoded packet output of the second receiver, configured to re-encode the second packet as a second re-encoded signal;
 a digital delay, connected to a difference output of the subtractor, and configured to output the de-interfered signal as a delayed difference output with a time offset based on a processing time of the second receiver and the second re-encoder to produce the second re-encoded signal from the de-interfered signal; and
 a comparator, connected to a second digital delay and the second re-encoder, configured to transmit a least mean squared training signal to the linear estimator and a back error propagation training signal to the nonlinear estimator based on a difference between the delayed difference output and the second re-encoded signal.

7. A method, comprising:
receiving a collided signal, the collided signal comprising a first signal carrying a first packet and a second signal carrying a second packet;
amplifying and digitizing the collided signal into a first digital signal at a first gain and a second digital signal at a second gain that is greater than the first gain;
determining a nonlinear interference component of the first packet on the second packet from the first digital signal;
decoding the first packet from the first digital signal;
re-encoding the first packet with a first estimated channel effect into an estimated signal;
calculating a linear interference component of the first packet on the second packet from the estimated signal;
removing the linear interference component and the nonlinear interference component from the second digital signal to produce a de-interfered signal; and
decoding the second packet from the de-interfered signal.

8. The method of claim 7, further comprising:
receiving the collided signal at a shared antenna with a first channel effect on the first packet and a second channel effect on the second packet; and
splitting the collided signal into the first signal onto a first receiver pathway as the first digital signal and the second signal onto a second receiver pathway as the second digital signal.

9. The method of claim 7, further comprising:
receiving the collided signal at a first antenna with a first channel effect on the first packet and a second channel effect on the second packet, wherein the collided signal as received on the first antenna is amplified and digitized into the first digital signal; and
receiving the collided signal at a second antenna, different than the first antenna, with a third channel effect on the first packet and a fourth channel effect on the second packet, wherein the collided signal as received on the second antenna is amplified and digitized into the second digital signal.

10. The method of claim 9, wherein the first estimated channel effect corresponds to a calculated effect of the third channel effect.

11. The method of claim 7, further comprising:
delaying and temporally aligning the second digital signal with the linear interference component and the nonlinear interference component before removing the linear interference component and the nonlinear interference component from the second digital signal.

12. The method of claim 7, wherein a nonlinear estimator of a Feed Forward Artificial Neural Network calculates the linear interference component of the first packet on the second packet from the estimated signal; and
wherein a linear estimator calculates the linear interference component of the first packet on the second packet from the estimated signal.

13. The method of claim 12, further comprising, before de-coding the first packet from the first digital signal, training the nonlinear estimator and the linear estimator offline, wherein offline training comprises:
producing a first known signal carrying a first training packet with a first known channel effect;
producing a second known signal carrying a second training packet with a second known channel effect;
colliding the first known signal with the second known signal to produce a collided training signal;
amplifying and digitizing the collided training signal into a first digital training signal at the first gain and a second training digital signal at the second gain;
determining a training linear interference component of the first training packet on the second training packet from the first digital training signal;
determining a training nonlinear interference component of the first packet on the second packet from the first digital training signal;
removing the training linear interference component and the training nonlinear interference component from the second digital training signal to produce a de-interfered training signal; and
decoding the second training packet from the de-interfered training signal as a training packet;
determining a difference between the second training packet and the training packet; and
applying a least mean squared training signal to the linear estimator and a back error propagation training signal to the nonlinear estimator based on the difference.

14. The method of claim 12, further comprising, after de-coding the first packet from the first digital signal and the second packet from the de-interfered signal, training the nonlinear estimator and the linear estimator online, wherein online training comprises:
re-encoding the second packet as a second re-encoded signal;
determining a different between the second re-encoded signal and the de-interfered signal; and
applying a least mean squared training signal to the linear estimator and a back error propagation training signal to the nonlinear estimator based on the difference.

15. A computer readable storage device including instructions that when executed by a processor perform an operation comprising:
receiving a collided signal, the collided signal comprising a first signal carrying a first packet and a second signal carrying a second packet;
amplifying and digitizing the collided signal into a first digital signal at a first gain and a second digital signal at a second gain that is greater than the first gain;
determining a nonlinear interference component of the first packet on the second packet from the first digital signal;
decoding the first packet from the first digital signal;
re-encoding the first packet with a first estimated channel effect into an estimated signal;
calculating a linear interference component of the first packet on the second packet from the estimated signal;
removing the linear interference component and the nonlinear interference component from the second digital signal to produce a de-interfered signal; and
decoding the second packet from the de-interfered signal.

16. The computer readable storage device of claim 15, further comprising:
receiving the collided signal at a shared antenna with a first channel effect on the first packet and a second channel effect on the second packet; and
splitting the collided signal into the first signal onto a first receiver pathway as the first digital signal and the second signal onto a second receiver pathway as the second digital signal.

17. The computer readable storage device of claim 15, further comprising:
receiving the collided signal at a first antenna with a first channel effect on the first packet and a second channel effect on the second packet, wherein the collided signal as received on the first antenna is amplified and digitized into the first digital signal; and receiving the collided signal at a second antenna, different than the first antenna, with a third channel effect on the first packet and a fourth channel effect on the second packet, wherein the collided signal as received on the second antenna is amplified and digitized into the second digital signal.

18. The computer readable storage device of claim 17, wherein the first estimated channel effect corresponds to a calculated effect of the third channel effect.

19. The computer readable storage device of claim 15, further comprising, before de-coding the first packet from the first digital signal, training a nonlinear estimator and a linear estimator offline, wherein offline training comprises:

producing a first known signal carrying a first training packet with a first known channel effect;

producing a second known signal carrying a second training packet with a second known channel effect;

colliding the first known signal with the second known signal to produce a collided training signal;

amplifying and digitizing the collided training signal into a first digital training signal at the first gain and a second training digital signal at the second gain;

determining a training linear interference component of the first training packet on the second training packet from the first digital training signal;

determining a training nonlinear interference component of the first packet on the second packet from the first digital training signal;

removing the training linear interference component and the training nonlinear interference component from the second digital training signal to produce a de-interfered training signal; and decoding the second training packet from the de-interfered training signal as a training packet;

determining a difference between the second training packet and the training packet; and applying a least mean squared training signal to the linear estimator and a back error propagation training signal to the nonlinear estimator based on the difference.

20. The computer readable storage device of claim 15, further comprising, after de-coding the first packet from the first digital signal and the second packet from the de-interfered signal, training a nonlinear estimator and a linear estimator online, wherein online training comprises:

re-encoding the second packet as a second re-encoded signal;

determining a different between the second re-encoded signal and the de-interfered signal; and applying a least mean squared training signal to the linear estimator and a back error propagation training signal to the nonlinear estimator based on the difference.

* * * * *

UNITED STATES PATENT AND TRADEMARK OFFICE
CERTIFICATE OF CORRECTION

PATENT NO. : 10,616,011 B1
APPLICATION NO. : 16/453839
DATED : April 7, 2020
INVENTOR(S) : Khashayar Mirfakhraei et al.

It is certified that error appears in the above-identified patent and that said Letters Patent is hereby corrected as shown below:

On the Title Page

In the illustrative figure, Ref. Numeral 330, Line 1, delete "Nonliinear" and insert -- Nonlinear --.

In the Drawings

On sheet 4 of 11, in Figure 3, reference numeral 330, Line 1, delete "Nonliinear" and insert -- Nonlinear --, therefor.

In the Specification

In Column 5, Line 46, delete "de-code" and insert -- decode --, therefor.

In Column 5, Line 52, delete "de-coding" and insert -- decoding --, therefor.

In Column 6, Line 49, delete "$+N(t)*s_2(t)$" and insert -- $+h_4(t)*s_2(t)$ --, therefor.

In Column 10, Line 2, delete "$s_z[n]$," and insert -- $s_{2i}[n]$, --, therefor.

In Column 11, Line 26, delete "$s_{11}[n])$." and insert -- $s_{1i}[n])$. --, therefor.

In Column 14, Line 20, delete "de-coded" and insert -- decoded --, therefor.

In Column 15, Line 57, delete "$S_{collided}(t)$" and insert -- $s_{collided}(t)$ --, therefor.

In Column 15, Line 60, delete "$S_{collided}(t)$" and insert -- $s_{collided}(t)$ --, therefor.

In Column 15, Line 62, delete "$S_{collided}(t)$" and insert -- $s_{collided}(t)$ --, therefor.

Signed and Sealed this
Ninth Day of June, 2020

Andrei Iancu
*Director of the United States Patent and Trademark Office*

CERTIFICATE OF CORRECTION (continued)
U.S. Pat. No. 10,616,011 B1

In Column 15, Line 65, delete "$S_{collided}(t)$" and insert -- $s_{collided}(t)$ --, therefor.

In Column 16, Line 8, delete "$S_{collided}(t)$" and insert -- $s_{collided}(t)$ --, therefor.

In Column 16, Line 31, delete "$+N(t)*s_2(t)$" and insert -- $+h_4(t)*s_2(t)$ --, therefor.

In Column 16, Lines 44-45, delete "may be may be" and insert -- may be --, therefor.

In Column 19, Line 41, delete "$f_{2NL}[n]$" and insert -- $f_{2NL}[n]$ --, therefor.

In the Claims

In Column 24, Line 36, in Claim 5, after "configured" insert -- to --.

In Column 25, Line 59, in Claim 13, delete "de-coding" and insert -- decoding --, therefor.

In Column 26, Line 22, in Claim 14, delete "de-coding" and insert -- decoding --, therefor.

In Column 26, Line 28, in Claim 14, delete "different" and insert -- difference --, therefor.

In Column 27, Line 13, in Claim 19, delete "de-coding" and insert -- decoding --, therefor.

In Column 28, Line 16, in Claim 20, delete "de-coding" and insert -- decoding --, therefor.

In Column 28, Line 22, in Claim 20, delete "different" and insert -- difference --, therefor.